United States Patent
Kasai et al.

(10) Patent No.: US 6,919,976 B2
(45) Date of Patent: Jul. 19, 2005

(54) INFORMATION DISPLAY DEVICE

(75) Inventors: Ichiro Kasai, Kawachinagano (JP); Hiroaki Ueda, Suita (JP); Yasushi Tanijiri, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/848,889

(22) Filed: May 19, 2004

(65) Prior Publication Data
US 2004/0233488 A1 Nov. 25, 2004

Related U.S. Application Data

(63) Continuation of application No. 09/801,405, filed on Mar. 8, 2001, now abandoned.

(30) Foreign Application Priority Data

Mar. 17, 2000 (JP) .......................................... 2000-81681
Mar. 17, 2000 (JP) .......................................... 2000-81682

(51) Int. Cl.$^7$ .............................................. G03H 1/00
(52) U.S. Cl. ........................... 359/13; 359/15; 359/630; 345/7
(58) Field of Search ........................... 359/13, 15, 431, 359/480–482, 629, 630, 631, 633, 638, 640, 833, 834, 857, 858; 345/7–9; 385/133

(56) References Cited

U.S. PATENT DOCUMENTS

| | | | |
|---|---|---|---|
| 4,711,512 A | 12/1987 | Upatnieks | 345/7 |
| 5,453,877 A | 9/1995 | Gerbe et al. | 359/633 |
| 5,699,186 A | 12/1997 | Richard | 359/569 |
| 5,699,194 A | 12/1997 | Takahashi | 359/633 |
| 5,790,311 A | 8/1998 | Togino | 359/630 |
| 5,886,822 A | 3/1999 | Spitzer | 359/630 |
| 6,008,778 A | 12/1999 | Takahashi et al. | 345/7 |
| 6,049,429 A | 4/2000 | Lizuka et al. | 359/631 |
| 6,094,241 A | 7/2000 | Yamazaki | 349/11 |
| 6,122,080 A | 9/2000 | Ogata | 359/15 |
| 6,166,834 A | 12/2000 | Taketomi et al. | 359/13 |
| 6,377,409 B2 | 4/2002 | Kanai | 359/834 |

FOREIGN PATENT DOCUMENTS

| | | |
|---|---|---|
| JP | 5-346508 A | 12/1993 |
| JP | 7-333551 A | 12/1995 |
| JP | 9-185009 A | 7/1997 |
| JP | 9-197336 A | 7/1997 |
| JP | 10-307263 A | 11/1998 |
| JP | 10-319343 A | 12/1998 |

*Primary Examiner*—Mark A. Robinson
*Assistant Examiner*—Alessandro Amari
(74) *Attorney, Agent, or Firm*—Sidley Austin Brown & Wood LLP

(57) ABSTRACT

An information display device provided with a prism having at least two reflecting surfaces arranged in facing each other and a hologram surface formed of a reflection-type hologram. And at least one of the two reflecting surfaces is a light-beam-selective surface that selectively transmits or reflects light in accordance with its incident angle. An image light emitted from an image display means enters the prism, and is reflected between the reflecting surfaces, and then is diffractively reflected on the hologram surface, and, after being transmitted through the light-beam-selective surface, is directed to an observer's pupil.

27 Claims, 23 Drawing Sheets

INFORMATION DISPLAY DEVICE

This application is a continuation application of application Ser. No. 09/801,405, filed Mar. 8, 2001, now abandoned, which is based on application Nos. 2000-81681 and 2000-81682 filed in Japan on Mar. 17, 2000, the entire contents of which are hereby incorporated by reference.

BACKGROUND OF THE INVENTION

1. Field of the Invention

The present invention relates to an information display device, and particularly to an information display device for use in an image display apparatus that is used with being placed in front of an observer's eyes.

2. Description of the Prior Art

Conventionally, several image display apparatuses that are used in front of an observer's eyes with being mounted on an observer's head or face, or being held with hands are known, and they are manufactured for use in the field of virtual reality and in the so-called personal theaters. In recent years, an image display apparatus serving as a display for a wearable computer has been studied.

As a detailed construction, for example, Japanese Laid-Open Patent Application No. H7-333551 discloses a construction, that is, in an observation optical system that directs light emitted from an original image to an observer's eyeballs, the light is totally reflected from a curved surface in the direction away from the eyeballs, and the totally reflected light is reflected on reflecting surfaces, preferably, on the reflecting surfaces having different optical powers resulting from the difference in their azimuth angles, and then the light is transmitted through the curved surface and directed to the eyeballs.

Japanese Laid-Open Patent Application No. H9-197336 discloses another construction, that is, in an image display apparatus composed of an image display element for displaying images and an eyepiece optical system (ocular optical system) for directing the image formed on the image display element to an observer's eyeballs without achieving image formation in an optical path, the eyepiece optical system has at least three surfaces, and the light exiting from the image display element is reflected at least three times on the at least three surfaces and reaches the observer's eyeballs, and at least one of the three reflecting surfaces is a concave mirror concave to the observer's eyeballs side.

U.S. Pat. No. 5,790,311 discloses another construction comprising at least three juxtaposed optical surfaces, characterized in that at least two optical surfaces of these three optical surfaces are defined by curved surfaces concave to a pupil position side of the optics system and at least four reflections occur between the curved surfaces.

U.S. Pat. No. 5,699,194 discloses another construction that includes an image display device for displaying an image, and an ocular optical system for projecting the image formed by the image display device and for leading the projected image to an observer's eyeballs. In this image display apparatus, the ocular optical system is arranged such that light rays emitted from the image display device are reflected three or higher odd-numbered times before reaching the observer's eyeball, and that a surface of the ocular optical system that is disposed immediately in front of the observer's eyeball is a reflecting surface which internally reflects the light rays, and through which the light rays exit from the ocular optical system.

Japanese Laid-Open Patent Application No. H10-307263 discloses another construction in which a prism optical element formed of a plurality of surfaces with a medium having a refractive index larger than 1 in between includes a first to a fourth surface. The first surface has both a transmitting action that permits light to enter the inside of the prism optical element or to exit from the inside of the prism optical element, and an internally reflecting action in the prism optical element. The second surface is so arranged as to face the first surface with the medium in between, and has an internally reflecting action in the prism optical element. The third surface is so arranged as to be substantially adjacent to the second surface and as to face the first surface with the medium in between, and has an internally reflecting action in the prism optical element. And the fourth surface has a transmitting action that, when the first surface has an action of permitting light to enter the inside of the prism optical element, permits light to exit from the inside of the prism optical element, and that, when the first surface has an action of permitting light to exit from the inside of the prism optical element, permits light to enter the inside of the prism optical element. And this construction fulfills a range defined by a predetermined condition.

U.S. Pat. No. 6,094,241 discloses another construction that has a display optical system for guiding a light beam from a display means displaying image information to an eyeball of an observer, and an image-pickup optical system for focusing a light beam from the outside on an image-pickup device. This construction includes an optical path separating means provided in an optical path that is arranged to substantially align an eyeball optical axis of a light beam incident from the display optical system to the eyeball of the observer or a virtual eyeball optical axis as an extension of the eyeball optical axis with an outside optical axis of a light beam incident from the outside of the image-pickup optical system, and a shield means for preventing the light beam from the display means from entering the image pickup device of the image-pickup optical system.

Japanese Laid-Open Patent Application No. H5-346508 discloses another construction including a hologram lens by which a light beam corresponding to image information transmitted from an image display device is diffracted in a predetermined direction, and the image information and other image information are spatially superimposed for being observed in an identical field of view. Here, the hologram lens is of an off-axial type composed of a plurality of elemental holograms having the same numerical aperture.

Japanese Laid-Open Patent Application No. H9-185009 discloses another construction that includes an image display means arranged on a predetermined part of spectacles such as spectacle lenses or spectacle frames for outputting a displayed image toward the spectacle lenses, and a see-through means that enables an observer to observe, through the spectacle lenses, the displayed image and the outside at the same time.

Japanese Laid-Open Patent Application No. H10-319343 discloses another construction including an image display means for emitting image display light, a bundle of optical fibers that reduces the image display light transmitted from the image display means and emits it via the end of an exiting surface, and an in-front-of-eyes optical means that directs the image display light exiting from the end of the exiting surface of the bundle of optical fibers to an observer's eyes by diffracting or reflecting it in order to make the observer observe a virtual image formed in accordance with the image display light.

U.S. Pat. No. 5,453,877 discloses another construction including, in series: a generator or source of light images to provide a light radiation, a collimation objective or collimator to collimate the radiation, a combiner comprising a confocal assembly with a first parabolic mirror, a second parabolic mirror, and a transparent plate. The first mirror is reflective to reflect the collimated radiation towards the second mirror, and the second mirror is partially transparent to enable, simultaneously, the transmission by reflection, towards an observer, of the radiation received from the first mirror, and the transmission by transparency, towards the observer, of an external radiation. The transparent plate have two ends being formed, respectively, by the two parabolic mirrors, and a first and a second surface thereof are parallel. And an optical path of the collimated radiation between the objective and the observer includes, substantially, a first crossing of one of the two parallel faces, a reflection on the first mirror, several total reflection on the parallel faces, a reflection on the second mirror and a second crossing of one of the two parallel faces, wherein the plate is formed by several elements, each of the two parallel faces being formed by a surface for each element, and the surfaces being arranged so as to constitute a folded version of the system.

U.S. Pat. No. 6,008,778 discloses another construction including an ocular optical system that leads an image formed by two-dimensional display means to an eyeball of an observer to thereby project the image as an enlarged virtual image. The two-dimensional display means has a first two-dimensional display device and a second two-dimensional display device. An ocular optical system includes a first surface having both reflecting and transmitting actions, a second surface having at least reflecting action, and a third surface having at least reflecting action. The first surface is disposed to face an observer's eyeball. The second surface is disposed to face the first surface. The third surface is disposed to face the first surface in a side-by-side relation to the second surface. Thus, images displayed by the first and second two-dimensional display devices are led to the observer's eyeball.

In the construction disclosed in Japanese Laid-Open Patent Application No. H7-333551 previously described, an observation optical system is composed of a prism using concave reflecting surfaces including a light-beam-selective surface for selectively performing total reflection or transmission in accordance with the incident angle of a light beam; however, it is so designed that, in the prism, reflection occurs with geometrical regular-reflection-angles, and this is disadvantageous in making the optical system thinner. In addition, in the prism, there is no portion where reflection occurs between the surfaces facing each other, in other words, the prism does not have a light-beam-guide portion, and this makes the prism thicker. Furthermore, this apparatus is provided with a so-called see-through function for simultaneously observing a displayed image and an external image; however, a combiner thereof has a semi-transmissive surface, and therefore the light amount of the external image and the displayed image is reduced to as a low level of half of the original amounts. In this construction, prisms for correcting the distortion of a transmitted image delivered from the outside are connected on a curved surface, and this makes it difficult to manufacture this apparatus.

In the constructions disclosed in Japanese Laid-Open Patent Application No. H9-197336, U.S. Pat. No. 5,790,311, and U.S. Pat. No. 5,699,194 previously described, a prism has surfaces facing each other and free-form surfaces partly including a light-beam-selective surface that selectively performs total reflection or transmission in accordance with the incident angle of a light beam. Here, a light beam is directed to a concave reflecting surface through reflection occurring between the surfaces facing each other. However, the same as the construction mentioned above, they are so designed that reflection occurs in the prisms with geometrical regular-reflection-angles, and this is disadvantageous in making the optical system thinner.

In the constructions disclosed in Japanese Laid-Open Patent Application No. H10-307263, and U.S. Pat. No. 6,094,241 described previously, the same as the construction mentioned above, a prism has surfaces facing each other and free-form surfaces partly including a light-beam-selective surface that selectively performs total reflection or transmission in accordance with the incident angle of a light beam. It is so designed that a light beam is directed to a concave reflecting surface through reflection occurring between the surfaces facing each other. And these constructions makes it possible to achieve see-through observation of a transmitted image delivered from the outside. However, the same as the construction previously described, it is so designed that, in the prism, reflection occurs with geometrical regular-reflection-angles, and this is disadvantageous in making the optical system thinner.

Especially, in the construction disclosed in Japanese Laid-Open Patent Application No. H10-307263, see-through observation of a transmitted image delivered from the outside is achieved out of an image display area, and therefore it is impossible to secure a wide external observed area. This application includes a practical example in which the outside is observed while withdrawing a prism; however, this requires a movable portion, and therefore it makes the construction complicated. In the construction disclosed in U.S. Pat. No. 6,094,241, a half mirror is used as a combiner, and therefore the transmitted image delivered from the outside becomes dark.

Japanese Laid-Open Patent Application Nos. H5-346508, H9-185009, and H10-319343 disclose constructions in which, as a combiner, a reflection-type hologram lens is used; however, their optical systems are not so deigned as to fold light beams from the displayed image and are thus less compact. In addition, in order to separate the displaying light beams from the observing light beams, a decentering amount of the hologram combiner is increased and aberrations caused by decentering occur (hereinafter, aberrations caused by decentering will be referred to as "decentering aberrations"), and therefore it is impossible to obtain a favorable displayed image. Especially, the construction disclosed in Japanese Laid-Open Patent Application No. H9-185009 has a large decentering amount, and therefore it is substantially impossible to obtain a wide angle of view.

In the construction disclosed in U.S. Pat. No. 5,453,877, to a prism using concave reflecting surfaces including a light-beam-selective surface that selectively performs total reflection or transmission in accordance with the incidental angle of a light beam, a prism for correcting distortion of a transmitted image delivered from the outside is attached. Here, as a display optical system, an image-reformation optical system is used, and therefore this is less compact. In addition, an eyepiece function of the display optical system is achieved by reflection on the concave reflecting surface, and a hologram functions only as a combiner and does not have any optical power for such as condensing light. Therefore, reflection occurring in the prism (or a plate in a practical example) has geometrical regular-reflection-angles, and this is disadvantageous in making the optical system thinner. Furthermore, it is difficult to form a hologram on a concave reflecting surface.

In the construction disclosed in U.S. Pat. No. 6,008,778 previously described, because of its optical construction, an image light beam passes a half-mirror twice, and therefore its light amount is reduced to less than one fourth of the original amount, and this makes the obtained image dark. In addition, in a prism, there is no portion where reflection occurs between the surfaces facing each other, in other words, there is no light-beam-guide portion, and this makes the prism thicker. Furthermore, it is so designed that a display element is arranged in front of an observer, and therefore it is impossible to provide this apparatus with a see-through function which enables the observer observe a displayed image and an external image at the same time.

SUMMARY OF THE INVENTION

An object of the present invention is to provide an information display device that can realize a thin and compact construction, obtain a fine image even while securing a wide angle of view, and achieve see-through observation of the outside in a natural manner.

To achieve the above object, according to one aspect of the present invention, an information display apparatus is provided with: an image display member which displays images; and a prism having at least two reflecting surfaces arranged in facing each other and another hologram surface formed of a reflection-type hologram, and at least one of the two reflecting surfaces arranged in facing each other is a light-beam-selective surface which selectively transmits or reflects light, wherein an image light beam corresponding to image information exiting from the image display member is reflected between the two reflecting surfaces arranged in facing each other, and is diffractively reflected on the hologram surface, and then, after being transmitted through the light-beam-selective surface, is directed to an observer's pupil.

According to another aspect of the present invention, an information display apparatus is provided with: a first image display member for displaying a first image; a first prism having at least two reflecting surfaces arranged in facing each other and another reflecting surface, and at least one of the two reflecting surfaces arranged in facing each other is a light-beam-selective surface which selectively transmits or reflects light; a second image display member for displaying a second image; and a second prism having the same construction as the first prism, wherein an image light beam corresponding to the information of the first image exiting from the first image display member is reflected between the two reflecting surfaces of the first prism arranged in facing each other, and is reflected on another reflecting surface of the first prism, and then, after being transmitted through the light-beam-selective surface, is directed to an observer's pupil, on the other hand, an image light beam corresponding to the information of the second image exiting from the second image display member is reflected between the two reflecting surfaces of the second prism arranged in facing each other, and is reflected on another reflecting surface, and then is, after being transmitted through the light-beam-selective surface, directed to the same observer's pupil as the light beam of the first image.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1A:
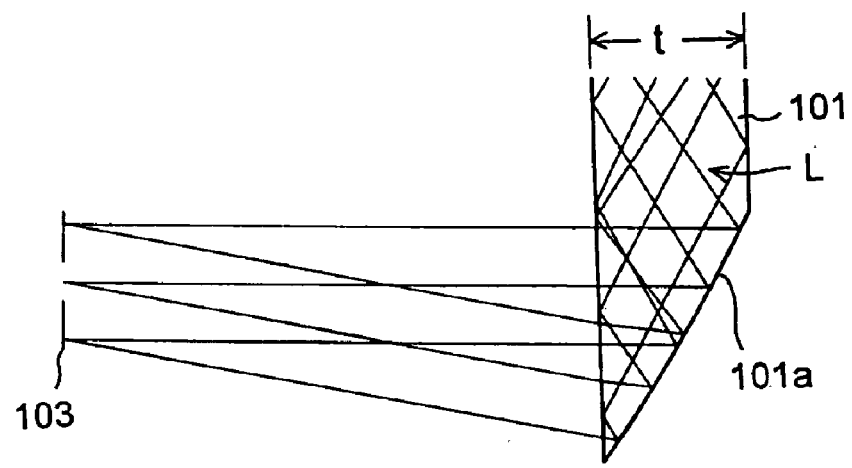
FIGS. 1A and 1B are diagrams comparatively explaining geometrical regular reflection and diffractive reflection on a hologram.
Figure 1B:
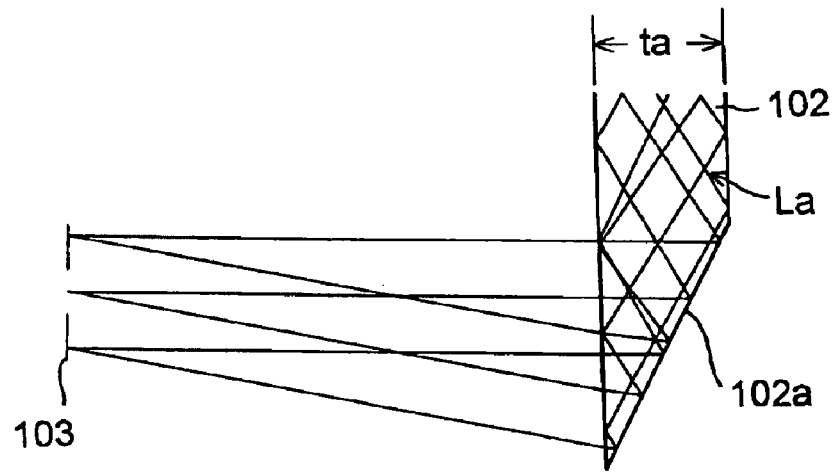

Hereinafter, embodiments of the present invention will be described with reference to drawings. In an information display device employed in the present invention, a hologram lens is used, and an arbitrary displayed image formed on an image display element such as a liquid crystal display is directed to a pupil to be observed. FIGS. 1A and 1B are diagrams schematically explaining, regarding a construction in which a displayed image is directed to a pupil for being observed, the comparison between a case using geometrical regular reflection and another case using diffractive reflection on a hologram. FIG. 1A shows a case using geometrical regular reflection, and FIG. 1B shows another case using diffractive reflection on a hologram, respectively.

In FIG. 1A, reference numeral 101 represents a prism serving as a light-guide portion, reference numeral 101a represents a concave reflecting surface that is obliquely arranged on the lower end of the prism 101, and reference numeral 103 represents a pupil. In FIG. 1B, reference numeral 102 represents a prism serving as a light-guide portion, reference numeral 102a represents a hologram surface that is obliquely arranged on the lower end of the prism 102, and reference numeral 103 represents a pupil. As shown in FIG. 1A, a light beam L emitted from a displayed image is transmitted downward in the prism 101, and is regularly reflected on the concave reflecting surface 101a, and then is directed to the pupil 103 while being condensed. On the other hand, as shown in FIG. 1B, a light beam La emitted from a displayed image is transmitted downward in the prism 102, and is diffractively reflected on the hologram surface 102a, and then is directed to the pupil 103 while being condensed.

Here, as described earlier, a hologram functions as a diffractive element and can achieve diffractive reflection which is different from geometrical regular reflection achieved by a mirror or the like. In other words, regardless of the inclination of a hologram substrate, it is possible to diffractively reflect light in an arbitrary direction, and therefore the size of an optical system is not defined by the geometric conditions.

Figure 2:
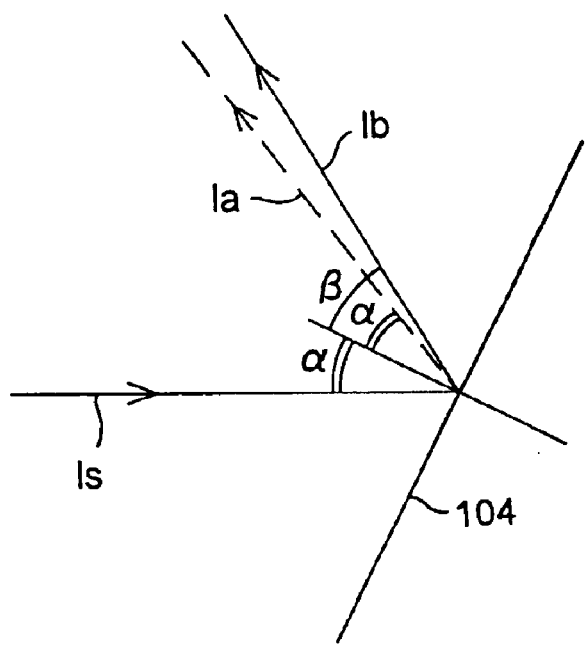
FIG. 2 is a diagram comparatively explaining geometrical regular reflection and diffractive reflection on a hologram.

Specifically, for example, as schematically shown in FIG. 2, when incident light ls having entered a reflecting surface 104 is regularly reflected and the thus obtained reflected light is drawn with a broken line and expressed as la, both the incident angle and the reflection angle become α, the same angle. However, when a diffractive reflecting surface is used as the reflecting surface 104, it is possible to make a reflection angle β of a diffractively reflected light lb that is drawn with a solid line wider than α. Because of this property, if the direction of the reflected light is the same, compare to the case that the reflecting surface achieves regular reflection, it is possible to make the inclination of the reflecting surface smaller.

Therefore, as shown in FIGS. 1A and 1B, respectively, if the position of the pupil 103 is the same, the hologram surface 102a can be arranged in a less inclined status compare to the concave reflecting surface 101a, and this helps make the thickness ta of the prism 102 thinner than the thickness t of the prism 101a. In addition, although a hologram is formed as a flat surface, it can have optical power, and therefore when the hologram is made to have a see-through function described later, through its diffractive reflection, it functions as a lens element and affects the light beam traveled from the displayed image, on the other hand, it does not affect external light, and this property makes it possible to observe an external image in a natural manner.

Another construction of the information display device employed in the present invention includes two image display elements, and, by using the eyepiece optical systems corresponding to the individual image display elements, it makes a light beam emitted from the each image display element enter one pupil. The individual image display elemetns and eyepiece optical systems correspond to the different display areas, respectively, and by observing with putting these display areas together, it designs to widen the angle of view (angle of visibility of displayed image), while realizing a thin and compact structure.

In addition, in the eyepiece optical systems, reflection occurring between the reflecting surfaces facing each other shall be total-reflection, and by that reflection, a light beam from the displayed image is guided, and therefore it is possible to realize a construction in which the image display elements do not intercept an ordinary viewing zone. In this construction, external light is not intercepted, and therefore it is possible to have the see-through function which enables an observer to observe the displayed image and the external image simultaneously, and, at the same time, it can obtain a wide external observed area.

When a hologram is used for achieving an eyepiece optical function, it is possible to perform see-through observation in a better and more natural manner. As mentioned above, although a hologram is formed as a flat surface, it can have optical power, and therefore when it is made to have the see-through function, through its diffractive reflection, it functions as a lens element and affects the light beam traveled from the displayed image, on the other hand, it does not affect external light, and thereby it is possible to observe an external image in a natural manner.

Figure 3:
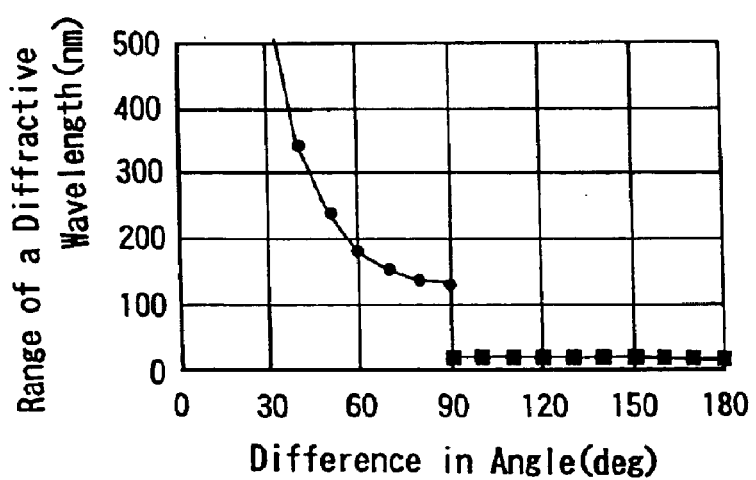
FIG. 3 is a graph explaining the range of a diffractive wavelength of a transmission-type and a reflection-type hologram.

FIG. 3 is a graph explaining the range of a diffractive wavelength of a transmission-type and a reflection-type hologram. This graph indicates the wavelength selectivity of a transmission-type and a reflection-type hologram relative to the difference in angles between an incident light and an exiting light, on condition that the refractive index of a holographic photosensitive material is 1.5, its recording wavelength is 530 nm, and the thickness of the holographic photosensitive material is 5 μm. In this graph, the axis of abscissa represents the difference in angles, and the axis of ordinate represents the range of a diffractive wavelength. As shown in the graph, when the difference in angles is equal or smaller than 90°, in other words, in a case of a transmission-type hologram, it is found that the range of a diffractive wavelength becomes very wide, namely longer than one hundred and several dozens nm. The wavelength of a visible light falls between around 400 nm to 700 nm with having the range of wavelength around 300 nm, and therefore there may be a case that a transmission-type hologram affects almost all sorts of visible light.

On the other hand, when the difference in angles is greater than 90°, in other words, in a case of a reflection-type hologram, the range of a diffractive wavelength becomes remarkably narrow compare to a transmission-type hologram, and therefore its wavelength selectivity becomes very high. In other words, a reflection-type hologram has a property that affects a certain wavelength, but does not affect other wavelengths than that. When a reflection-type hologram is used as a combiner for achieving the see-through function which enables an observer to observe a displayed image and an external image simultaneously, because it affects only a certain wavelength, the external light receives little influence from the combiner and this makes it possible to perform see-through observation in a bright and good condition.

Figure 4:
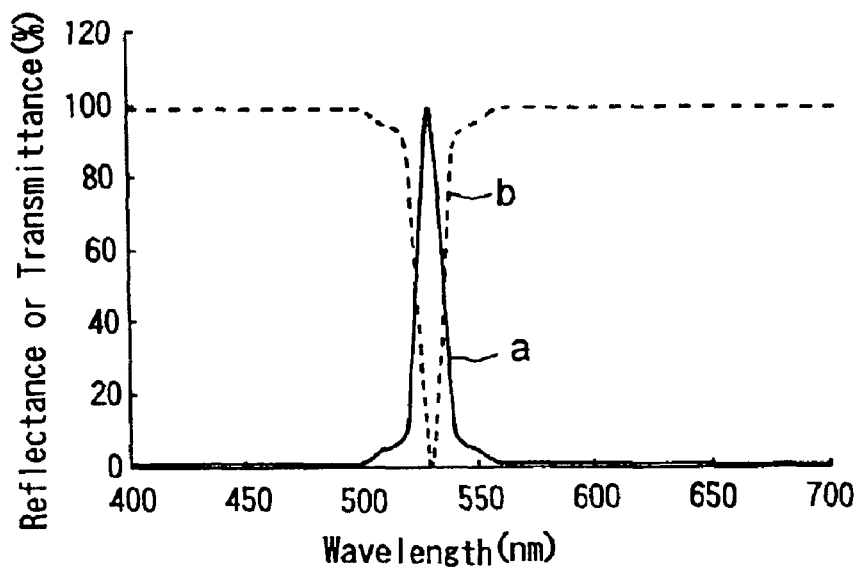
FIG. 4 is a graph showing the relationship between the intensities of reflected light and transmitted light relative to the wavelength of an incident light (monochrome)

FIG. 4 is a graph showing, in a monochrome reflection-type hologram, one example of the relationship between the luminous intensities of reflected and transmitted light relative to the incident light having a wavelength that falls in the range of visible light. In this graph, the axis of abscissa represents the wavelength (nm), and the axis of ordinate represents the reflectance or transmittance (%). A curve a drawn with a solid line indicates the reflectance, and a curve b drawn with a broken line indicates the transmittance, respectively. A reflection-type hologram affects only light having a specific wavelength (diffractive wavelength), and therefore, as shown in the graph, here, it reflects the light having a wavelength around 530 nm and transmits the light having wavelengths other than that. This makes it possible to perform see-through type information display in which an observer observes external light and image light while superimposing them.

Figure 5:
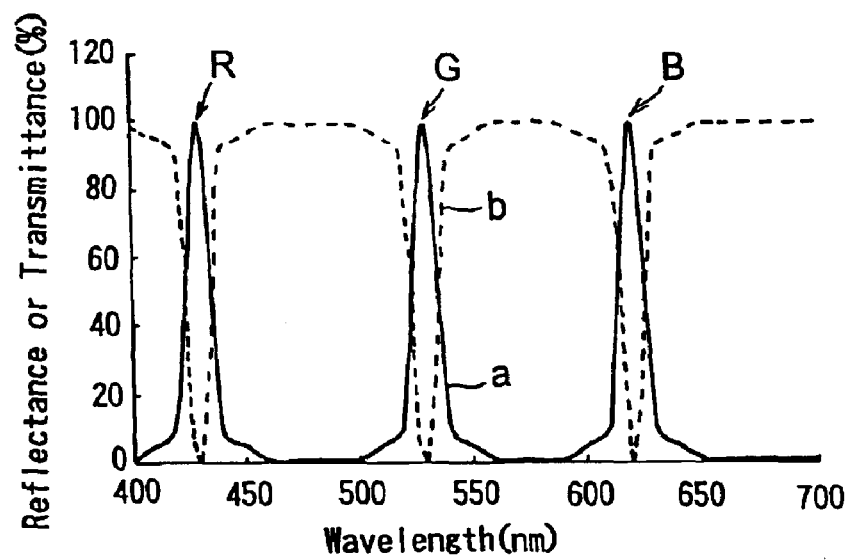
FIG. 5 is a graph showing the relationship between the intensities of reflected light and transmitted light relative to the wavelength of an incident light (color)

FIG. 5 is a graph showing, in a color reflection-type hologram, one example of the relationship between the luminous intensities of reflected and transmitted light relative to the incident light having a wavelength that falls in the range of visible light. In this graph, the axis of abscissa represents the wavelength (nm), and the axis of ordinate represents the reflectance or transmittance (%). A curve a drawn with a solid line indicates the reflectance, and a curve b drawn with a broken line indicates the transmittance, respectively. A reflection-type hologram affects only light having a specific wavelength (diffractive wavelength), and therefore, as shown in the graph, here, it reflects the light having the wavelengths of R, G, and B, and transmits light having other wavelengths.

Because of this property, even when color image light is displayed, it is possible to achieve see-through type information display in which an observer observes external light and image light while superimposing them. A hologram has a diffractive wavelength corresponding to its recording wavelength, and therefore the above mentioned hologram can be obtained by providing multiple-exposure with different wavelengths on a single holographic photosensitive material, or by putting holograms made by different recording wavelengths in layers.

Figure 6:
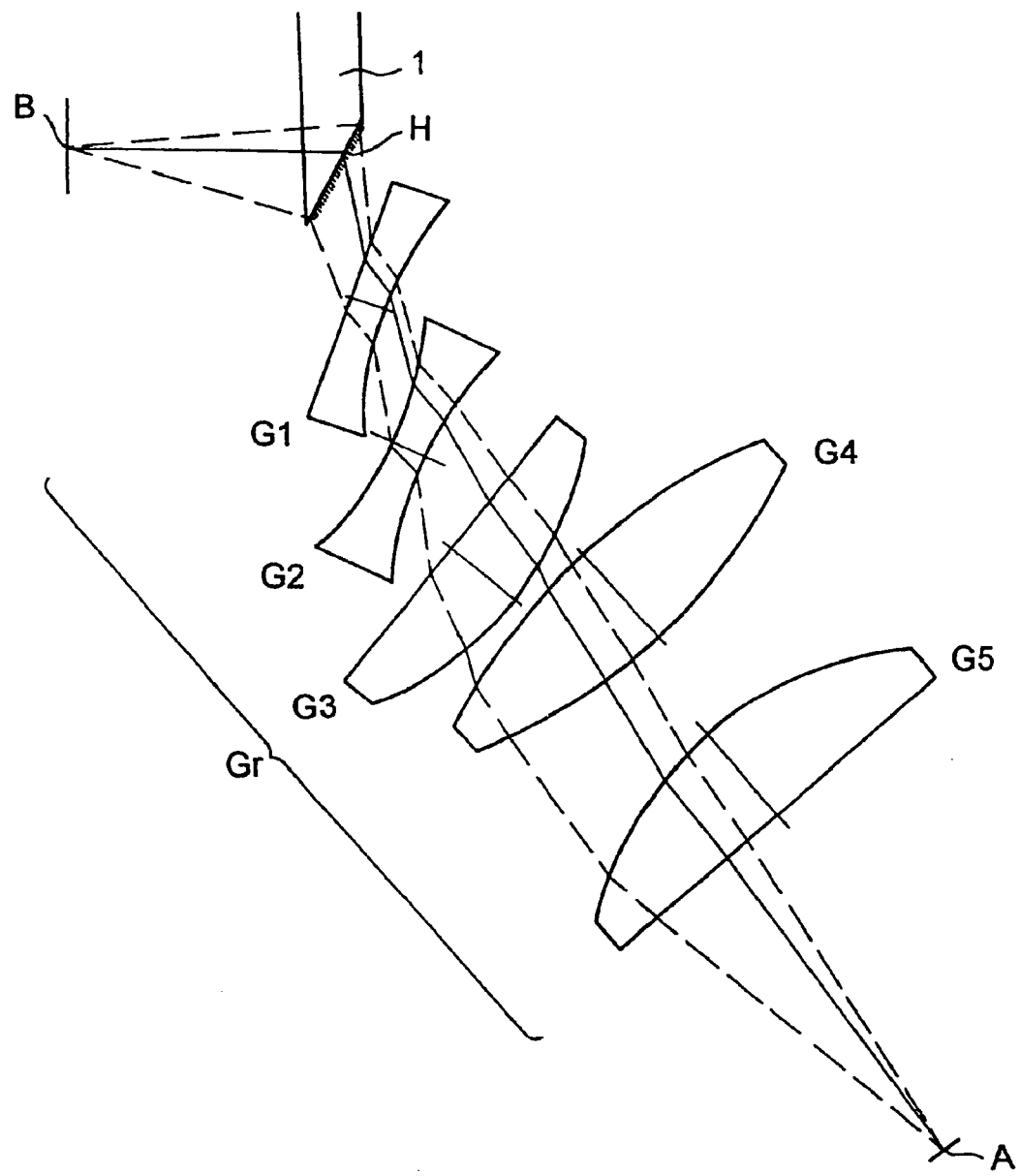
FIG. 6 is a diagram schematically illustrating the outline of the construction of an optical system forming a hologram.

FIG. 6 is a diagram schematically illustrating the outline of the construction of an optical system forming a hologram (hereinafter, such an optical system is referred to as a "manufacturing optical system"). In the information display device of the present invention, a hologram lens is obliquely arranged relative to a light beam of the displayed image and has optical power as an eyepiece optical system, and therefore it forms a nonaxismmetric optical system. When this nonaxismmetric optical system performs only the same function as that of a centered lens, asymmetrical distortion (trapezoid distortion) caused by decentering or curvature of image surface occurs. In order to prevent this, it is preferable that a hologram be provided with not only rotationally symmetrical wavefront reproducibility but also free-form surface wavefront reproducibility.

As shown in this figure, this kind of hologram is formed by using a manufacturing optical system Gr in which a plurality of lenses are decentered and combined together. Here, a construction for manufacturing a hologram lens employed in an information display device in a first embodiment described latter is cited as an example. For manufacturing a hologram lens, a laser beam is split into two beams of light by a beam splitter, and two point light sources A, B, namely a first and a second point light source, are arranged in the individual beams of light, and make the light emitted from the two point light sources enter a holographic photosensitive material H that is obliquely arranged on the lower end of a prism 1.

Here, the second point light source B is so arranged as to substantially correspond to the position of an observer's pupil in the displayed image of the information display device. By arranging the second point light source B in this way, the optical path of light emitted from the second point light source B and that of light from the displayed image become substantially identical, and this makes it possible to make the diffraction efficiency utmost while the hologram lens is in a use. In addition, between the first point light source A and the holographic photosensitive material H, the manufacturing optical system Gr mentioned above is arranged which is composed of five lenses G1 to G5 that are decentered and combined together. This manufacturing optical system Gr is so deigned that the wavefront of the light emitted from the first point light source A is so controlled that the displayed image is observed in a good condition.

Note that, as a hologram used in the embodiments described latter, for obtaining high diffraction efficiency and a bright displayed image and external image, it is preferable that the hologram be reflection type and among which a so-called volume hologram having a certain thickness, at the same time, a phase hologram exhibiting low absorbency of light is best suited.

Figure 7:
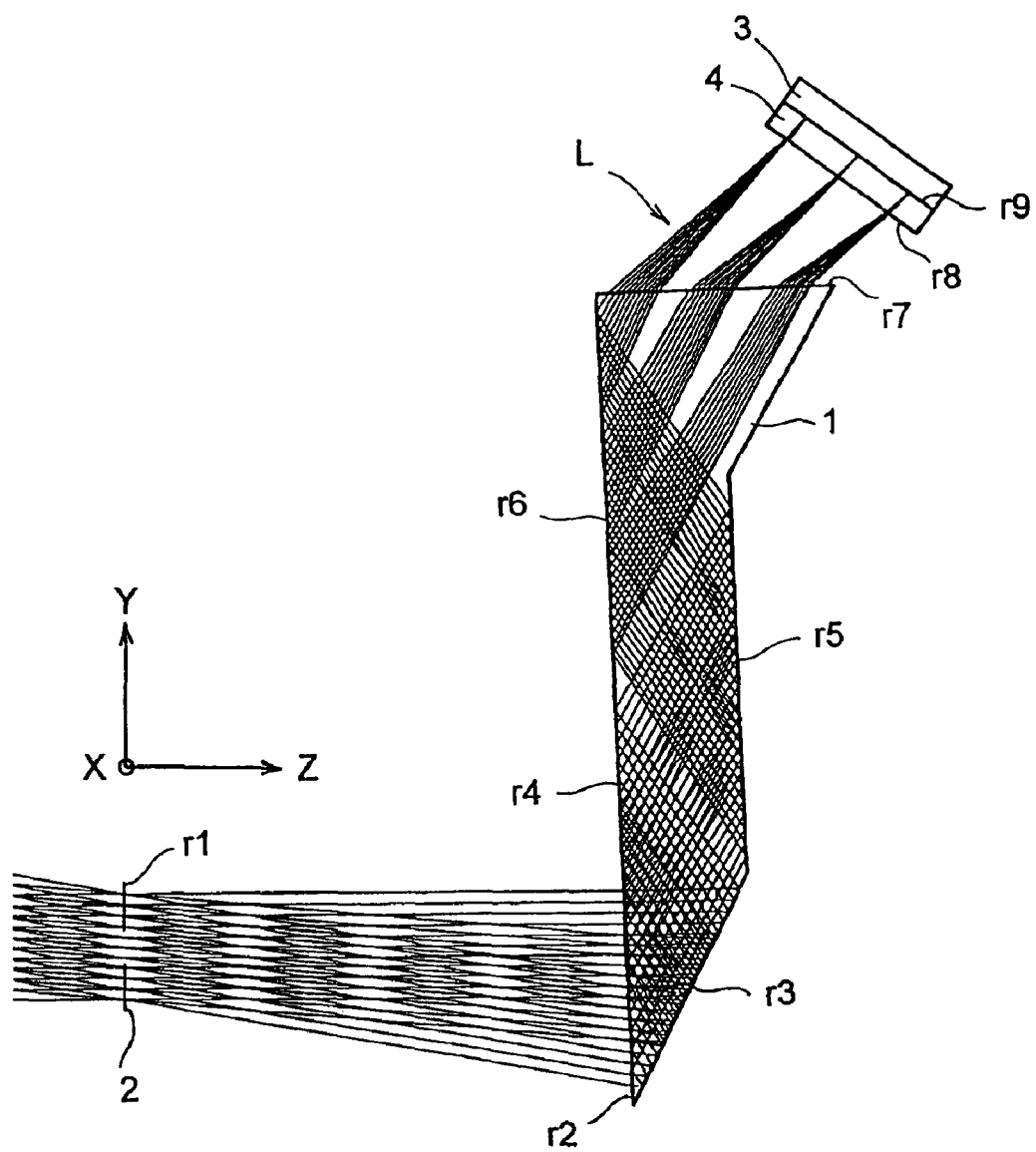
FIG. 7 is a vertical sectional view schematically illustrating the construction of an information display device of a first embodiment of the present invention.

FIG. 7 is a vertical sectional view schematically illustrating the construction of an information display device of a first embodiment of the present invention. In this figure, a prism 1 has a plate-like form with obliquely spreading in the upper right direction, and its upper end surface is an incident surface r7. And, on the left and right of the figure, it has a first reflecting surface r6 and a second reflecting surface r5 that face each other with being arranged substantially parallel to each other. Furthermore, on a lower end surface, a hologram surface r3 is obliquely arranged in the right direction. On the hologram surface r3, a hologram lens is formed. The first reflecting surface r6 and the hologram surface r3 form a cuneal shape. On the same surface, the first reflecting surface r6 includes light-beam-selective surfaces r4, r2 which selectively perform total-reflection or transmission in accordance with the incident angles.

In the left direction of the figure as seen from the lower end of the prism 1, a pupil 2 is located. The pupil 2 has a pupil surface r1. The coordinate system is determined in the following manner. The center of the pupil 2 is defined as the origin of the coordinate, the forward direction of the pupil 2 (i.e. rightward of the figure) is defined as the positive of the Z-axis, the upper direction is defined as the positive of the Y-axis, and the plane of the drawing is defined as the YZ-surface. And the direction perpendicularly backward (away from the reader) as seen from the plane of the drawing is defined as the positive of the X-axis. This is true also in the following embodiments. Here, in the upper right direction of the incident surface r7 of the prism 1, an image display element 3 formed of a transmission-type liquid crystal display or the like is arranged, and on its front surface serving as an image display surface r9, an image display member 4 formed of a flat plate glass is arranged. And its front surface is expressed as r8.

As shown in the figure, a light beam L conveying a displayed image emitted from the image display surface r9 of the image display element 3 passes through the image display member 4 and exits from its front surface r8, and then enters the incident surface r7 of the prism 1. The light beam L having entered the prism 1 via the incident surface r7 enters the first reflecting surface r6, and then is reflected (total reflection) here. The light beam L reflected from the first reflecting surface r6 enters the second reflecting surface r5 arranged with facing the reflecting surface r6, and then is reflected (total reflection) here. The light beam L reflected from the second reflecting surface r5 enters the light-beam-selective surface r4, and then is reflected (total reflection) here. The light beam L reflected from the light-beam-selective surface r4 enters the hologram surface r3.

The wavelength of the light beam L corresponds to the wavelength of the hologram surface r3 in which the diffraction efficiency of the hologram becomes the highest, and the light beam L is reflected on the hologram surface r3. The light beam L reflected on the hologram surface r3 passes through the light-beam-selective surface r2, and is directed to the pupil surface r1 of the pupil 2. The hologram on the hologram surface r3 has optical power and functions as an eyepiece optical system that enlarges the displayed image for being observed. Because of this property, the light beam L is projected on the observer's pupil while being enlarged. In addition, as shown in FIGS. 1A and 1B, in diffractive reflection of a hologram, it is possible to have reflecting angles different from that of geometric regular reflection, and this helps make the inclination of the hologram surface r3 small, and therefore this permits to make the prism 1 thinner.

In this embodiment, a light-guide portion for directing light to the hologram surface r3 of the prism 1 is thinly formed by the construction in which the light beam L is reflected a plurality of times on the reflecting surfaces arranged with facing each other, namely the first reflecting surface r6 and the second reflecting surface r5. In addition, owing to the light-beam-selective surface for selectively achieving total reflection or transmission in accordance with the incident angles, the light beam L is folded in the optical path, and this makes it possible to output the light beam without separating the optical path, and this helps realize a construction in which each optical component is arranged in a compact manner. Furthermore, the decentered amount of the hologram lens is reduced, and therefore it is possible to obtain a good displayed image with little decentering aberration.

Basically, a hologram exhibits the best wavefront reproducibility and the highest diffraction efficiency when it is given the light beam having the same wavelength and angle as the light beam which formed the hologram. Therefore, it is preferable that the light beam L emitted from the image display element 3 have the strongest luminous intensity at the wavelength in which the hologram lens formed on the hologram surface r3 exhibits the highest diffraction efficiency.

For example, when a hologram having the highest diffraction efficiency at the wavelength around 530 nm and, as the image display element 3, a non-self illuminating element such as a liquid crystal display are used, as a light source for illuminating this, a green LED or the like that has the strongest luminous intensity at the wavelength around 530 nm is desirable. An LED has the range of a luminous wavelength of which half-width is 20 to 40 nm, and therefore when it is used as a light source for emitting image display light, it is possible to obtain a construction exhibiting good energy efficiency.

And, as a light source, it is of course possible to use a laser that has the same luminous wavelength as the laser used for forming the hologram. As previously explained in FIG. 5, it is possible to use a color hologram that has the highest diffraction efficiency at a plurality of wavelengths.

Figure 8:
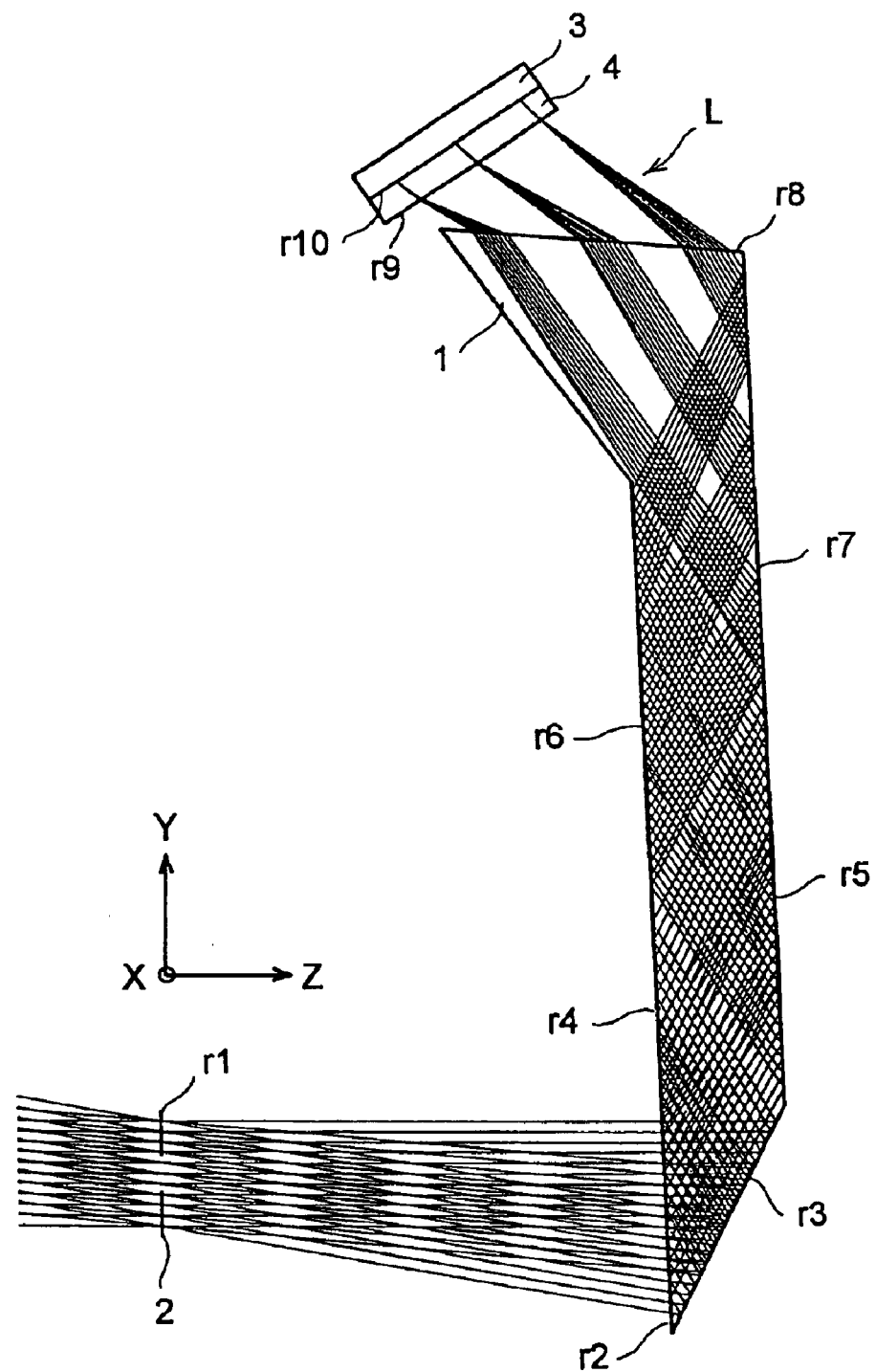
FIG. 8 is a vertical sectional view schematically illustrating the construction of an information display device of a second embodiment of the present invention.

FIG. 8 is a vertical sectional view schematically illustrating the construction of an information display device of a second embodiment of the present invention. Compare to the first embodiment, this embodiment adds reflection one time to the reflection occurring between the reflecting surfaces facing each other, and an image display member is arranged the observer's pupil side. Here, when a light beam L passes through a prism 1, the number of reflection occurring between the surfaces facing each other is increased one more time and this surface serves as a first reflecting surface (r5, r7), and a second reflecting surface (r6) has light-beam-selective surfaces (r2, r4) on the same surface. In other respects, the construction here is the same as in the first embodiment.

Figure 9:
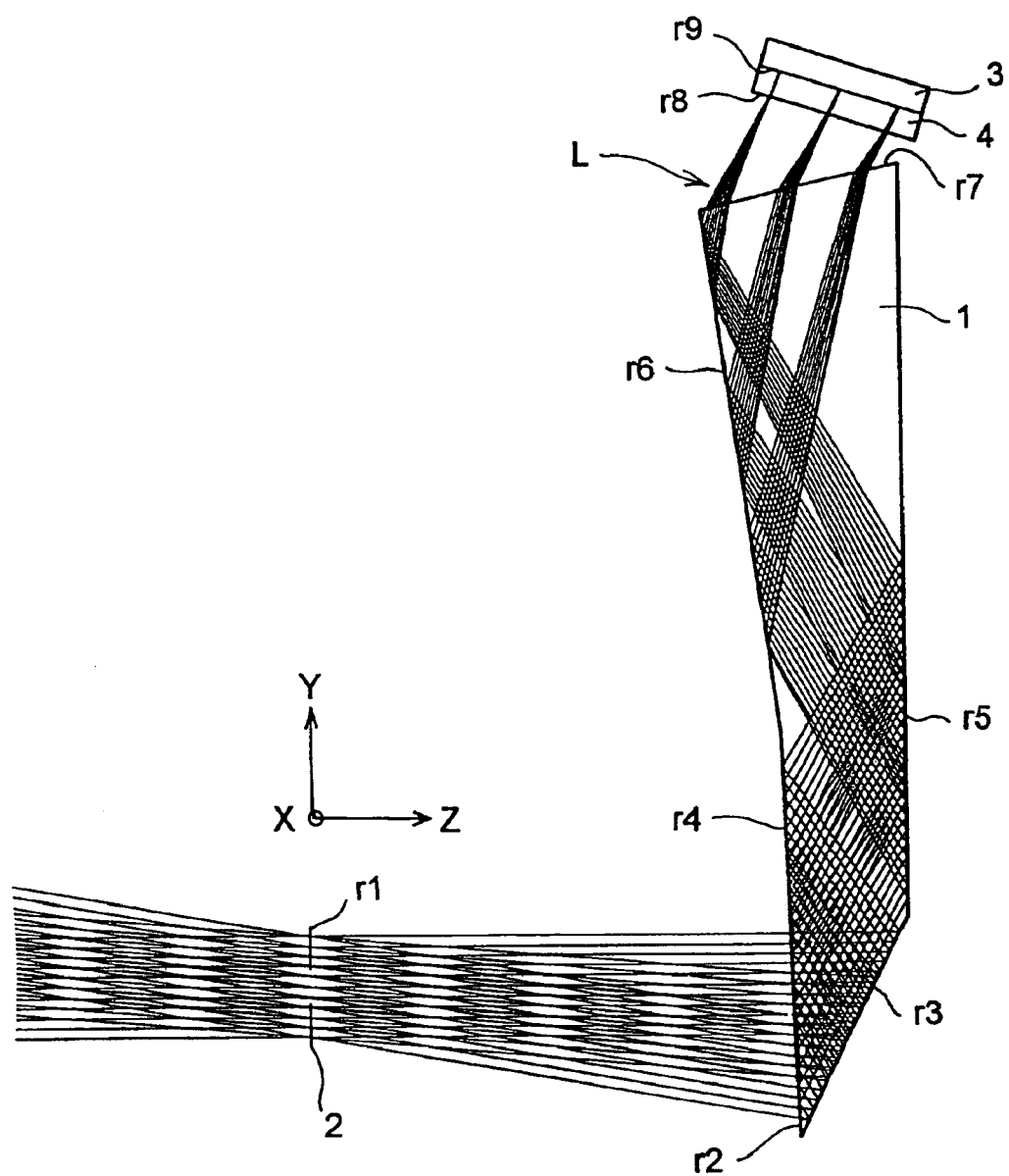
FIG. 9 is a vertical sectional view schematically illustrating the construction of an information display device of a third embodiment of the present invention.

FIG. 9 is a vertical sectional view schematically illustrating the construction of an information display device of a third embodiment of the present invention. This embodiment is an example in which, compare to the first embodiment, by arranging reflecting surfaces (a first and a second reflecting surface) facing each other with an inclination opening toward an incident surface of a light beam, an image display member is arranged on substantially right above a prism 1, and this helps make the entire optical system thin. Here, as a light-beam-selective surface, third reflecting surfaces (r2, r4) are arranged in connecting with the first reflecting surface (r6). A light beam L is transmitted in the prism 1 in the same manner as the first embodiment.

Figure 10:
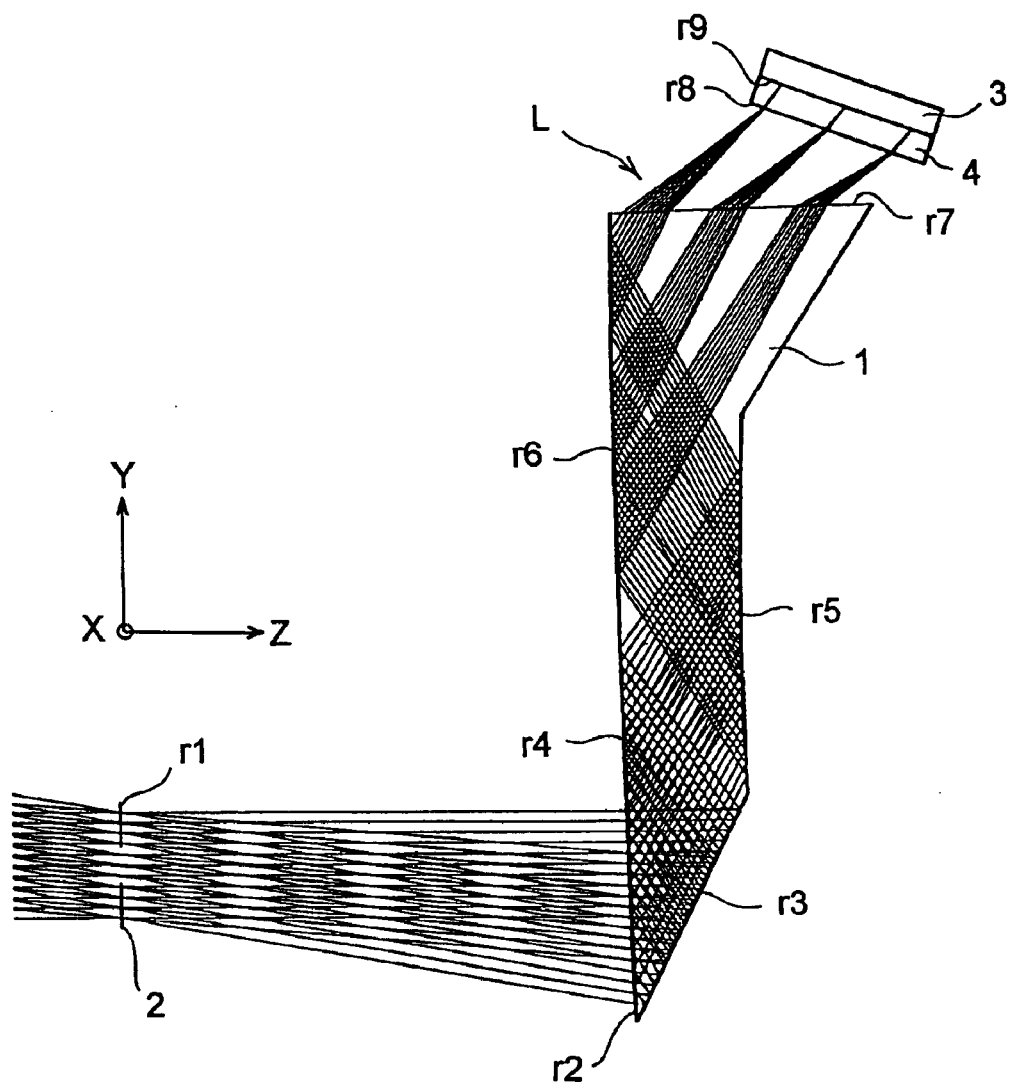
FIG. 10 is a vertical sectional view schematically illustrating the construction of an information display device of a fourth embodiment of the present invention.
Figure 11:
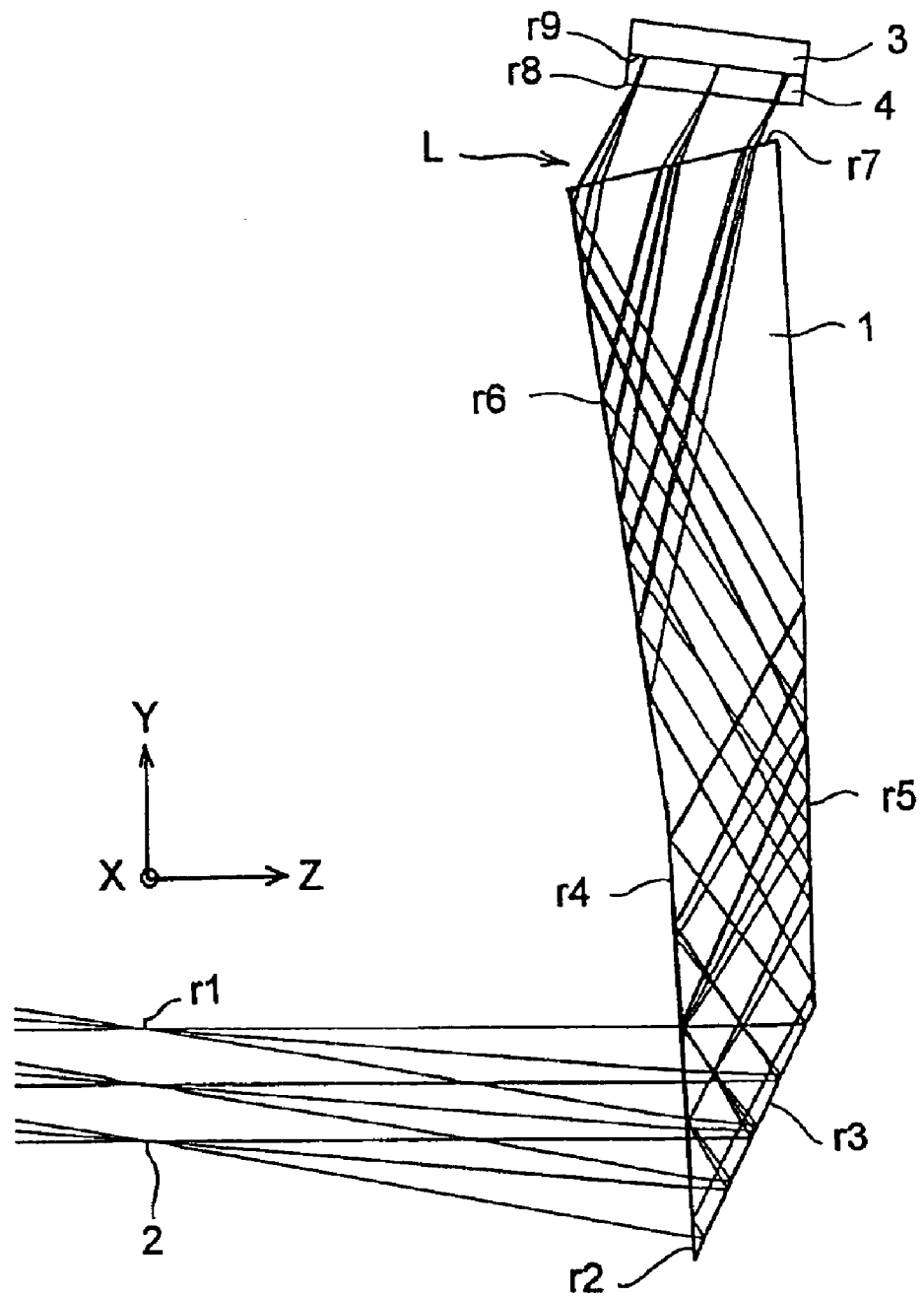
FIG. 11 is a vertical sectional view schematically illustrating the construction of an information display device of a fifth embodiment of the present invention.

FIGS. 10 and 11 are vertical sectional views schematically illustrating the constructions of information display devices of a third and a fourth embodiment of the present invention, respectively. The basic constructions here are the same as the first and third embodiments, respectively; however, in these embodiments, by forming reflecting surfaces facing each other as curved surfaces, a function for correcting aberrations in displayed images is provided for improving the quality of the images. Specifically, the curved surfaces are formed as free-form surfaces (anamorphic aspheric surfaces) for especially aiming at reducing decentering aberrations.

Figure 12:
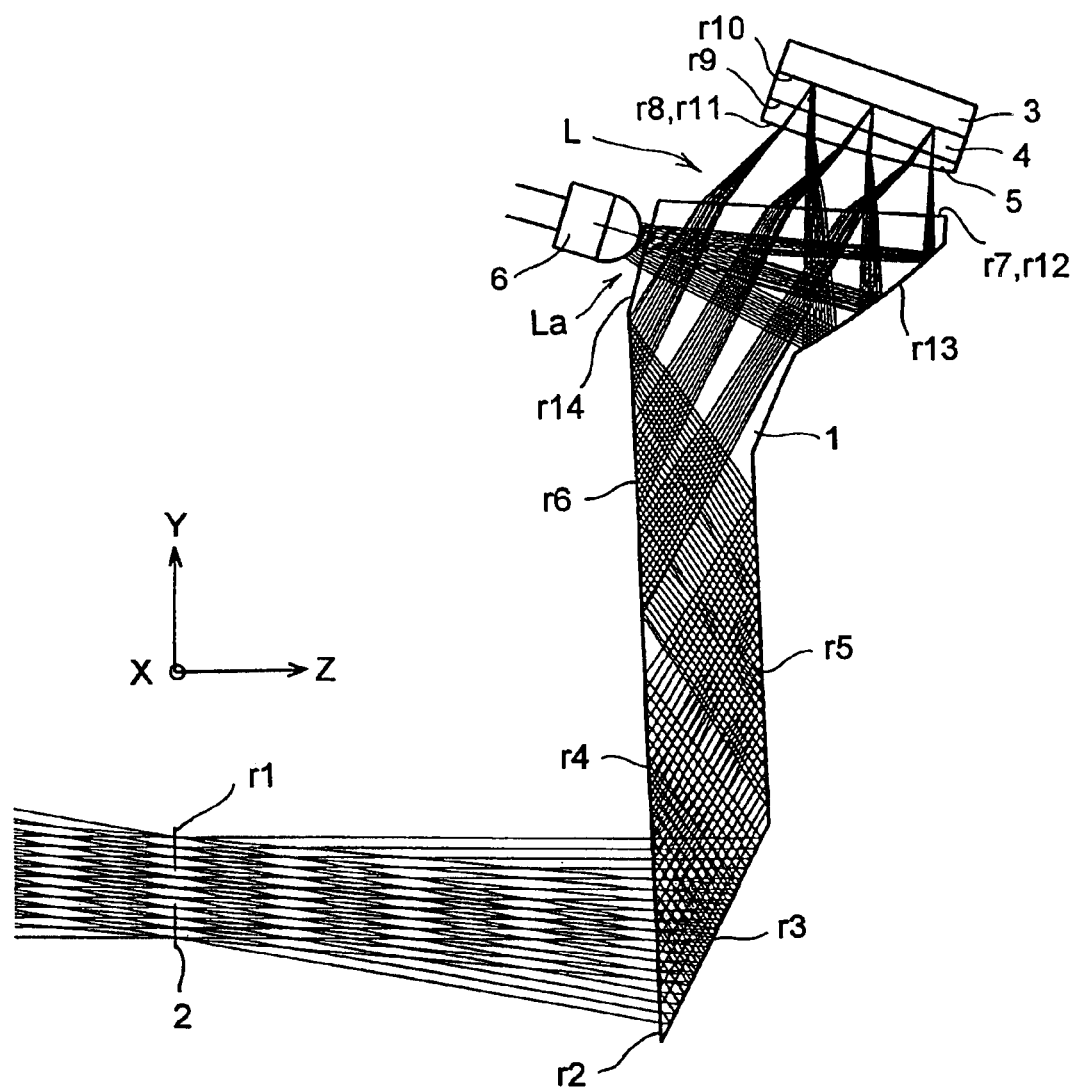
FIG. 12 is a vertical sectional view schematically illustrating the construction of an information display device of a sixth embodiment of the present invention.

FIG. 12 is a vertical sectional view schematically illustrating the construction of an information display device of a sixth embodiment of the present invention. In this embodiment, as an image display element, a reflection-type element such as a reflection-type liquid crystal display is used, and its illumination optical system is formed of a part of a prism. An image display element such as a reflection-type liquid crystal display needs illumination light to enter from the image display side thereof, and therefore, here, an illumination light source and a pupil are so defined as to have a substantially conjugate relationship for securing bright images with high illumination efficiency.

In this figure, an illumination light beam La emitted from a light source 6 such as an LED enters the prism 1 via an illumination light incident surface r14, and is reflected from an illumination reflecting surface r13, and then exits from an exiting surface r12. And the illumination light beam La enters a front surface r11 of a condenser lens 5 arranged in front of an image display member 4, and, through the image display member 4, it enters an image display element 3. Here, the illumination light beam is modulated into an image light beam, and the image light beam is reflected and exits from a display surface r10.

The light beam L of the displayed image exited from the display surface r10 of the image display element 3 passes through the image display member 4 and exits from its front surface r9. Then, the light beam L passes through the condenser lens 5 and exits from its front surface r8, and enters an incident surface r7 of the prism 1. After that, the light beam L is transmitted in the prism 1 in the same manner as the first embodiment. In this embodiment, the exiting surface r12 and the incident surface r7 of the prism 1 are the identical, and the front surface r11 and the front surface r8 of the condenser lens are the identical, respectively.

In the illumination optical system of this embodiment, near the prism 1, a surface that conjugates with a pupil 2 is formed of the condenser lens 5 that is a convex lens and the illumination reflecting surface r13 that is a concave mirror, and by arranging the light source 6 on the surface, the illumination optical system having a high illumination efficiency is obtained. This makes it possible to observe a bright image while making best use of illumination light amount. Thus, by forming an illumination optical system in a part of a prism, it helps make the entire optical system compact.

Figure 13:
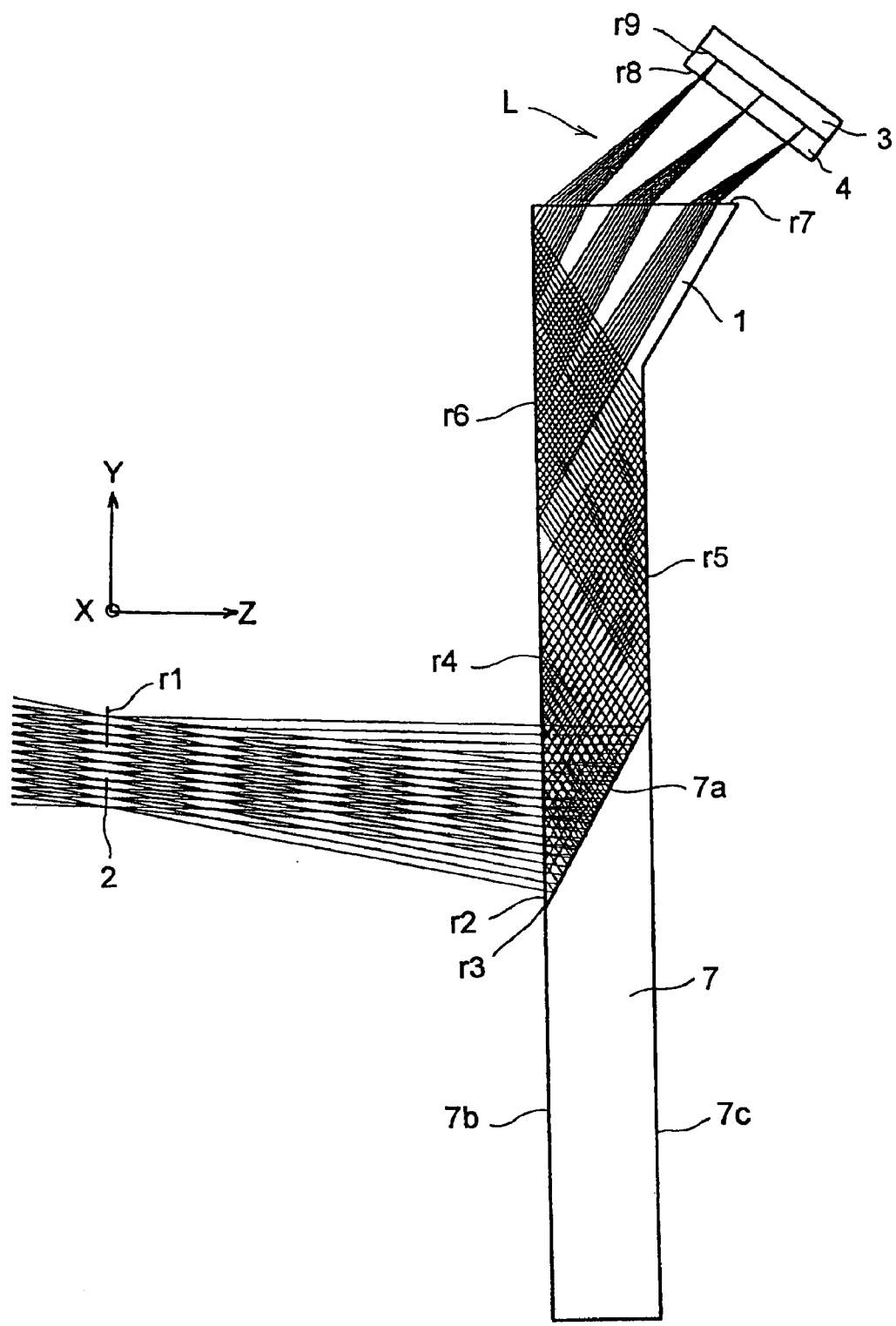
FIG. 13 is a vertical sectional view schematically illustrating the construction of an information display device of a seventh embodiment of the present invention.

FIG. 13 is a vertical sectional view schematically illustrating the construction of an information display device of a seventh embodiment of the present invention. This embodiment is an example in which a prism serving as a deflection correction member is applied to the construction of the first embodiment. In the first embodiment (also the second and sixth embodiments), the reflecting surfaces facing each other (the first and second reflecting surfaces) are arranged parallel to each other, and therefore this portion can transmit the external light traveling from the positive or negative direction of the Z-axis without distorting it and direct it to a pupil 2. However, for reducing the decentering amount of the hologram, the hologram surface r3 and the light-beam-selective surface are arranged not parallel but in an inclined state.

In other words, because the hologram surface r3 is obliquely arranged in the lower portion of the prism 1, the lower portion of the prism 1 forms a cuneal shape, and the external light passing through this portion exits therefrom in a full-size but with being deflected. Therefore, as shown in FIG. 13, this embodiment is provided with a deflection correction member 7 which is a prism that has an inclined surface 7a arranged in uniting with the hologram surface r3 or parallel to the hologram surface r3 with a slight space in between, and that has surfaces 7b, 7c that are identical to the extension surfaces of the first and second reflecting surfaces. Owing to this, deflection of the external light is corrected, and this makes it possible to observe the external light in a natural manner. The hologram surface r3 is flat, and therefore it is easy to form a holographic photosensitive material and it does not require high position accuracy in connecting the inclined surface 7a of the deflection correction member 7, and this makes it possible to attach the deflection correction member 7 to the prism 1 readily.

And, as described so far, reflection occurring between the surfaces facing each other is total reflection and external light is not intercepted, and therefore it is possible to obtain a wide external observed area. In the above-mentioned condition, the hologram surface r3 functions as a combiner.

In other words, because a reflection-type hologram like the hologram surface r3 affects only light having a specific wavelength (diffractive wavelength), as explained in FIG. 4 previously, it is possible to perform see-through type information display in which an observer observes external light and image light while superimposing them. As explained in FIG. 5 previously, this is true also to a color hologram. As this embodiment, the construction with which a deflection correction member is provided is also applicable to the second and sixth embodiments.

Figure 14:
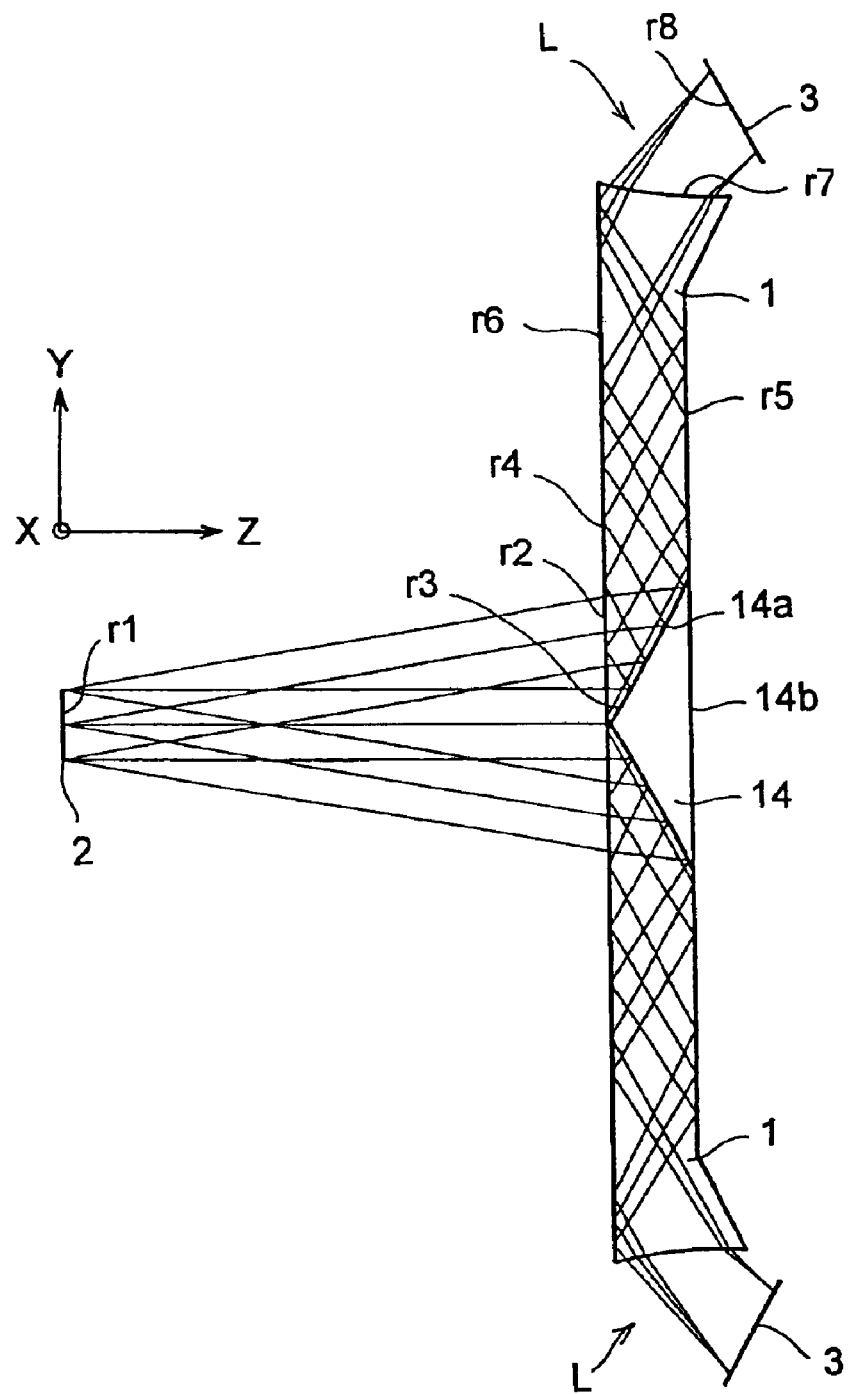
FIG. 14 is a vertical sectional view schematically illustrating the construction of an information display device of an eighth embodiment of the present invention.

FIG. 14 is a vertical sectional view schematically illustrating the construction of an information display device of an eighth embodiment of the present invention. In this figure, the upper part of an optical system corresponds to the upper part of an image display area and the lower part of the optical system corresponds to the lower part of the image display area. And the individual optical systems are arranged in perpendicularly symmetric (longitudinal direction on the plane of the drawing) with respect to the center of a pupil, i.e. the center of the image display area. Therefore, in the following explanation and the construction data described latter, the whole system is represented by the upper part of the optical system. This is true also in the following embodiments.

In this figure, a prism 1 has a plate-like form with obliquely spreading in the upper right direction, and its upper end surface is an incident surface r7. And, on the left and right of the figure, it has a first reflecting surface r6 and a second reflecting surface r5 that face each other with being arranged substantially parallel to each other. And, on the lower end of the prism 1, a concave reflecting surface r3 is arranged with inclining to a light beam incident surface of the prism. Owing to this, it is so constructed that the two optical systems in the upper and lower parts do not overlap each other. And the first reflecting surface r6 and the concave reflecting surface r3 form a cuneal shape. On the same surface, the first reflecting surface r6 has a light-beam-selective surfaces r4, r2 which selectively perform total-reflection or transmission in accordance with the incident angles of a light beam.

In the left direction of the figure as seen from the lower end of the prism 1, a pupil 2 is located. The coordinate system is determined in the following manner. The center of the pupil 2 is defined as the origin of the coordinate, the forward direction (i.e. rightward of the figure) is defined as the positive of the Z-axis, the upper direction is defined as the positive of the Y-axis, and the plane of the drawing is defined as the YZ-surface. And the direction perpendicularly backward (away from the reader) as seen from the plane of the drawing is defined as the positive of the X-axis. This is true also in the following embodiments. Here, in the right upper direction of the incident surface r7 of the prism 1, an image display element 3 formed of a transmission-type liquid crystal display or the like is arranged, and a display surface that is also a front surface of the image display element 3 is expressed as r8.

As shown in the figure, a light beam L emitted from the display surface r8 of the image display element 3 enters the incident surface r7 of the prism 1. The light beam L having entered the prism 1 via the incident surface r7 enters the first reflecting surface r6, and then is reflected (total reflection) here. The light beam L reflected from the first reflecting surface r6 enters the second reflecting surface r5 arranged with facing the reflecting surface r6, and then is reflected (total reflection) here. The light beam L reflected from the second reflecting surface r5 enters the light-beam-selective surface r4, and then is reflected (total reflection) here. The light beam L reflected from the light-beam-selective surface r4 enters the concave reflecting surface r3.

In this embodiment, the concave reflecting surface is obliquely arranged relative to a light beam of the displayed image and has optical power as an eyepiece optical system, and therefore it forms a nonaxismmetric optical system. When this nonaxismmetric optical system performs only the same function as that of a centered lens, asymmetrical distortion (trapezoid distortion) caused by decentering or curvature of image surface occur. In order to prevent this, it is preferable that the concave reflecting surface be provided with not only rotationally symmetrical wavefront reproducibility but also free-form surface wavefront reproducibility. Therefore, such a concave reflecting surface is formed as an anamorphic aspheric surface and best suited for correcting decentering aberrations.

In this embodiment, a light-guide portion for directing light to the concave reflecting surface r3 of the prism 1 is thinly formed by the construction in which the light beam L is reflected a plurality of times on the reflecting surfaces arranged with facing each other, namely the first reflecting surface r6 and the second reflecting surface r5. In addition, owing to the light-beam-selective surface for selectively achieving total reflection or transmission in accordance with the incident angles, the light beam L is folded in the optical path, and this makes it possible to output the light beam without separating the optical path, and this helps realize a construction in which each optical component is arranged in a compact manner. Furthermore, the decentered amount of the concave reflecting surface is reduced, and therefore it is possible to obtain a satisfactory displayed image with little decentering aberration.

Note that, this embodiment is so constructed that the individual displayed images displayed on the upper and lower image display elements 3 are perfectly independent with being separated into the upper and lower directions from the center of the image display area; however, it is possible to extend each image display element 3 and to make the individual image display areas overlap each other. This makes it possible to eliminate part lack of the diameter of a pupil in the center of the image display area. And, by using the concave reflecting surface as a half mirror, for example, for partly reflecting a light beam, and by arranging a deflection correction member for correcting deflection of external light, it is possible to perform see-through type information display in which an observer observes external light and image light with superimposing them. Hereinafter, this will be explained.

In this embodiment, reflecting surfaces (a first and a second reflecting surface) facing each other are arranged parallel to each other, and the individual reflecting surfaces of the upper and lower parts of prism 1 are arranged on the same surfaces, respectively. In the prism 1, reflection of the light beam emitted from the displayed image is performed as total reflection, and the reflection coating is not applied to the reflecting surfaces. Therefore, this portion can transmit the external light traveling from the positive or negative direction of the Z-axis without distorting it and direct it to the pupil 2. However, in order to make the light-beam-selective surface have light-beam-selectivity for selectively performing total reflection or transmission in accordance with the incident angles of a light beam, the concave reflecting surface r3 and the light-beam-selective surface are arranged not parallel but in an inclined state.

In other words, in the upper part of the prism 1, for example, because the concave reflecting surface r3 is obliquely arranged in a lower portion of the upper part of the prism 1, the lower portion of the upper part of the prism 1 forms a cuneal shape, and the external light passing through this portion exits therefrom with being deflected. In addition, because it is transmitted through the concave surface, the light is affected by its optical power, and therefore a satisfactory see-through function is not secured. Therefore, as shown in FIG. 14, this embodiment is provided with a deflection correction member 14 which is a prism that has an inclined surface 14a arranged in uniting with the concave reflecting surface r3 or parallel to the concave reflecting surface r3 with a slight space in between, and that has a surface 14b which is identical to the extension surface of the second reflecting surface. Owing to this, deflection of external light is corrected, and this makes it possible to observe external light in a natural manner.

Figure 15:
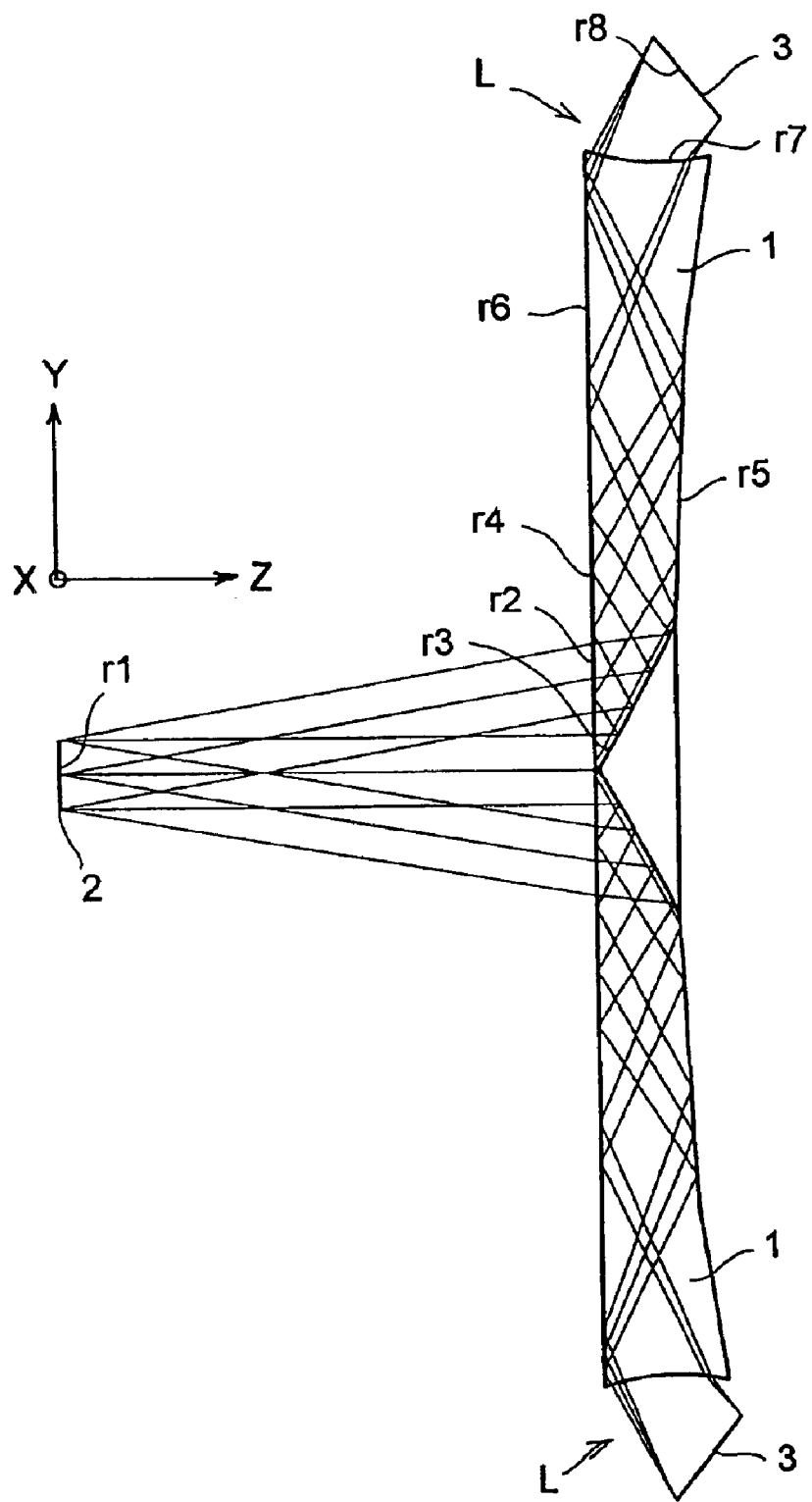
FIG. 15 is a vertical sectional view schematically illustrating the construction of an information display device of a ninth embodiment of the present invention.

FIG. 15 is a vertical sectional view schematically illustrating the construction of an information display device of a ninth embodiment of the present invention. This embodiment is an example in which, compare to the eighth embodiment, by arranging reflecting surfaces (a first and a second reflecting surface) facing each other with an inclination opening toward an incident surface of a light beam, an image display member is arranged on substantially right above a prism 1, and this helps make the entire optical system thin. The light beam L is transmitted in the prism 1 in the same manner as the eighth embodiment.

Figure 16:
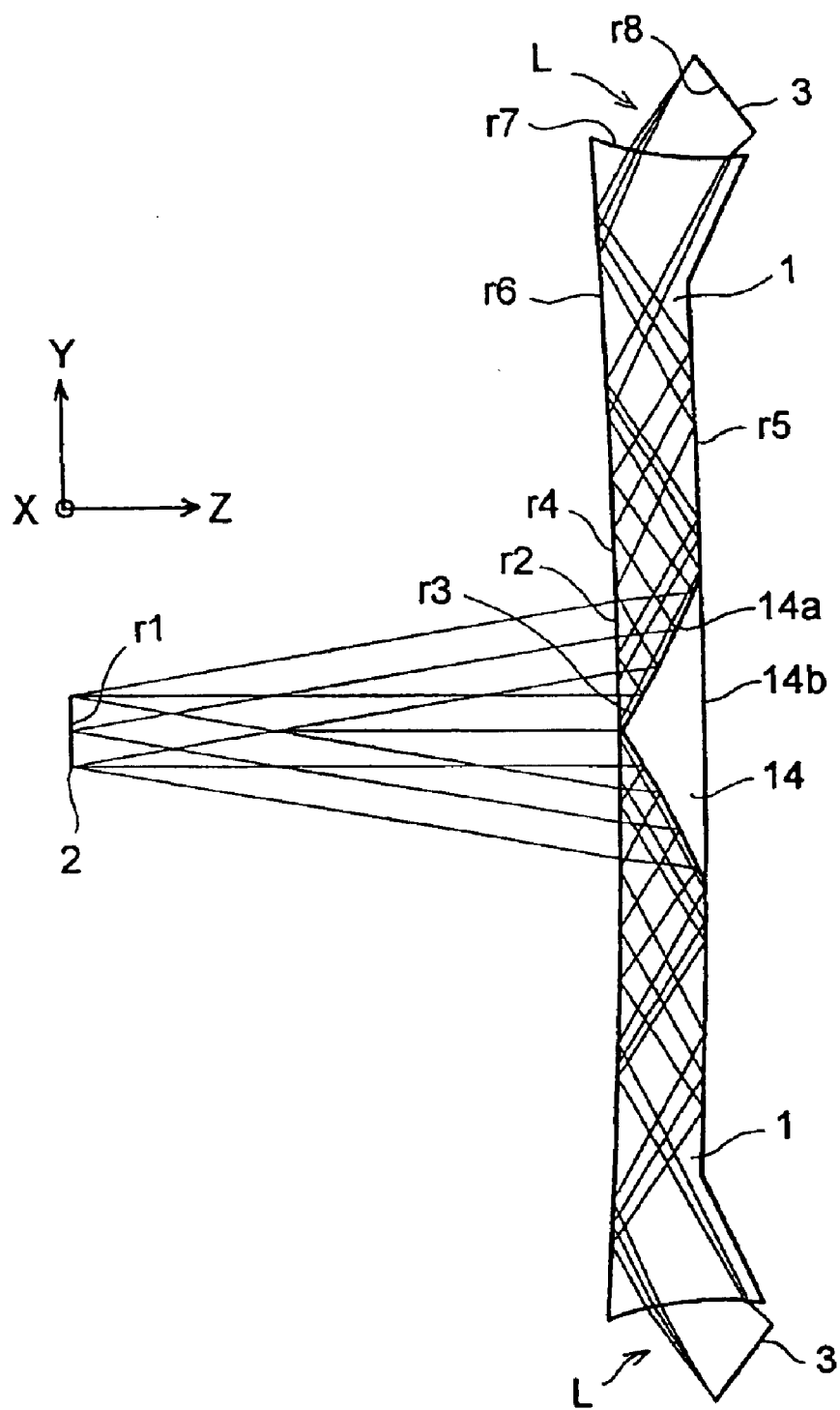
FIG. 16 is a vertical sectional view schematically illustrating the construction of an information display device of a tenth embodiment of the present invention.

FIG. 16 is a vertical sectional view schematically illustrating the construction of an information display device of a tenth embodiment of the present invention. The basic construction here is the same as the eighth and ninth embodiments; however, in this embodiment, by forming reflecting surfaces facing each other as curved surfaces, a function for correcting aberrations in displayed images are added for improving the quality of the images. Specifically, the curved surfaces are formed as curved surfaces rotationally symmetrical about the center of a pupil. When it is so constructed as to perform see-through observation of an external image, by making the prism 1 function as a lens element with using the power of this curved surfaces and by adding a diopter correction function to the prism 1, it is also possible to use this apparatus as conventional spectacles.

Figure 17:
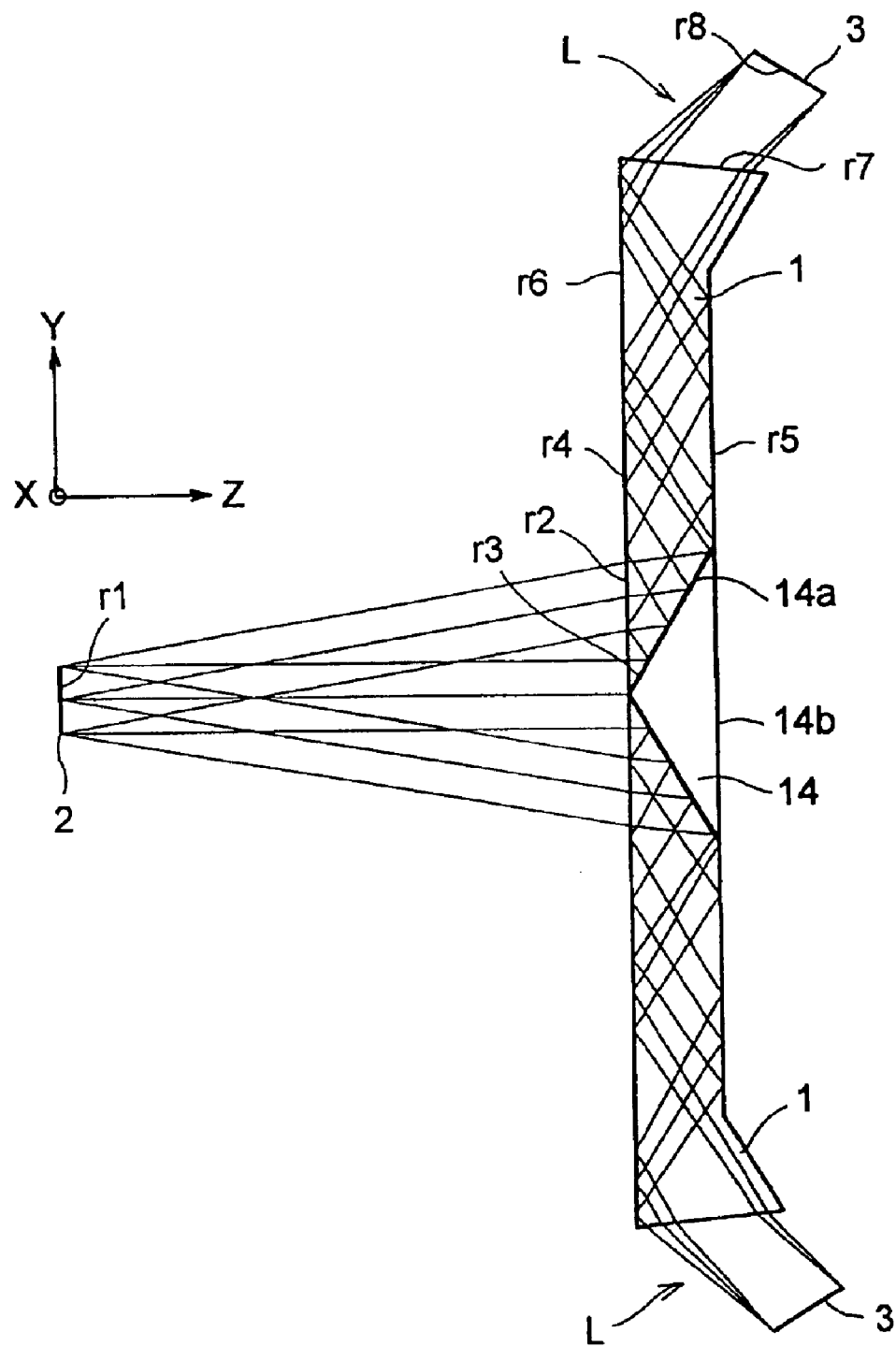
FIG. 17 is a vertical sectional view schematically illustrating the construction of an information display device of an eleventh embodiment of the present invention.

FIG. 17 is a vertical sectional view schematically illustrating the construction of an information display device of an eleventh embodiment of the present invention. The basic construction here is the same as the eighth embodiment; however, in this embodiment, the reflecting surface is not a concave reflecting surface but a hologram surface. Although a hologram is formed as a flat surface, it can have optical power, and therefore when it is given a see-through function, through its diffractive reflection, it functions as a lens element and affects the light beam traveled from the displayed image, and it does not affect external light, and thereby it is possible to observe an external image in a natural manner. Note that, as for a hologram to be used, for obtaining high diffraction efficiency and a bright displayed image and external image, it is preferable that the hologram be reflection type and among which a so-called volume hologram having a certain thickness, at the same time, a phase hologram exhibiting low absorbency of light is best suited.

In this figure, the wavelength of the light beam L emitted from the displayed image is substantially identical to the wavelength of the hologram surface r3 at which the diffraction efficiency of a hologram lens becomes the highest, and the light beam L is reflected on the hologram surface r3. The light beam L reflected on the hologram surface r3 passes through a light-beam-selective surface r2, and is directed to a pupil surface r1 of a pupil 2. The hologram lens on the hologram surface r3 has optical power and functions as an eyepiece optical system that enlarges a displayed image to be observed. Because of this property, the light beam L is projected on the observer's pupil while being enlarged.

Here, by making a single hologram have an eyepiece optical function, it is possible to realize a simple construction. The hologram surface r3 is flat, and therefore it is easy to form a holographic photosensitive material and it does not require high position accuracy in connecting an inclined surface 14a of a deflection correction member 14, and this makes it possible to attach the deflection correction member 14 to the prism 1 readily.

Basically, a hologram exhibits the best wavefront reproducibility and the highest diffraction efficiency when it is given the light beam having the same wavelength and angle as the light beam which formed the hologram. Therefore, it is preferable that the light beam L emitted from the image display element 3 have the strongest luminous intensity at the wavelength in which the hologram lens formed on the hologram surface r3 exhibits the highest diffraction efficiency.

For example, when a hologram having the highest diffraction efficiency at the wavelength around 530 nm and, as the image display element 3, a non-self illuminating element such as a liquid crystal display are used, as a light source for illuminating this, a green LED or the like that has the strongest luminous intensity at the wavelength around 530 nm is desirable. An LED has the range of luminous wavelength of which half-width is 20 to 40 nm, and therefore when it is used as a light source for emitting image display light, it is possible to obtain a construction exhibiting good energy efficiency.

And, as a light source, it is of course possible to use a laser that has the same wavelength as the laser used for forming the hologram. As previously explained in FIG. 5, it is also possible to use a color hologram that has the highest diffraction efficiency at a plurality of wavelengths. As explained in FIG. 4, a reflection-type hologram affects only light having a specific wavelength (diffractive wavelength), and therefore it does not reflect but transmits light having wavelengths other than a diffractive wavelength. Because of this property, compare to the eighth embodiment, the eleventh embodiment employing a hologram, it is possible to perform better see-through type information display. This is true also to a color hologram.

Figure 18:
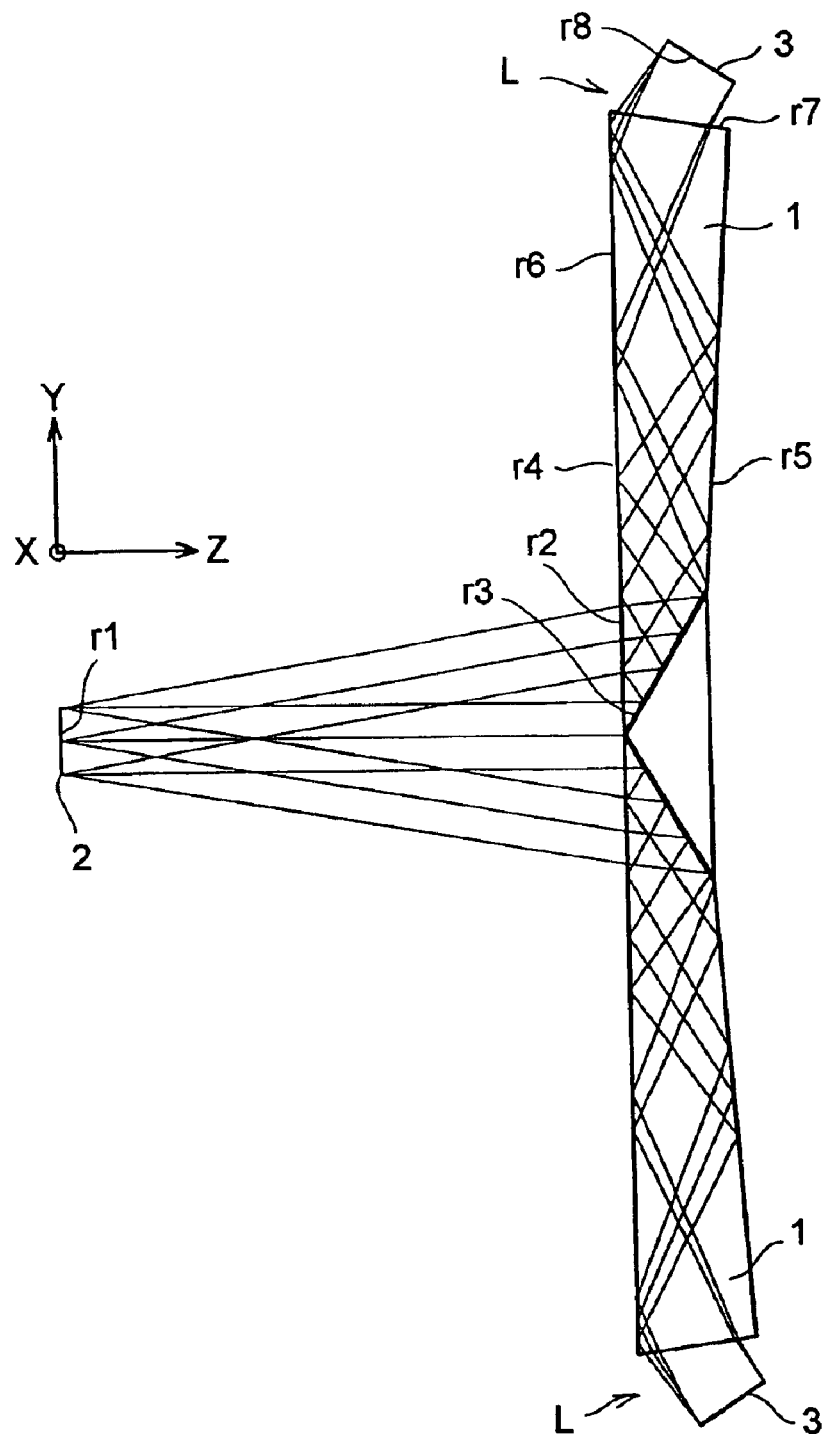
FIG. 18 is a vertical sectional view schematically illustrating the construction of an information display device of a twelfth embodiment of the present invention.

FIG. 18 is a vertical sectional view schematically illustrating the construction of an information display device of a twelfth embodiment of the present invention. This embodiment is an example in which, compare to the eleventh embodiment, by arranging reflecting surfaces (a first and a second reflecting surface) facing each other with an inclination opening toward an incident surface of a light beam, an image display member is arranged on substantially right above a prism 1, and this helps make the entire optical system thin. The light beam L is transmitted in the prism 1 in the same manner as the eleventh embodiment.

Figure 19:
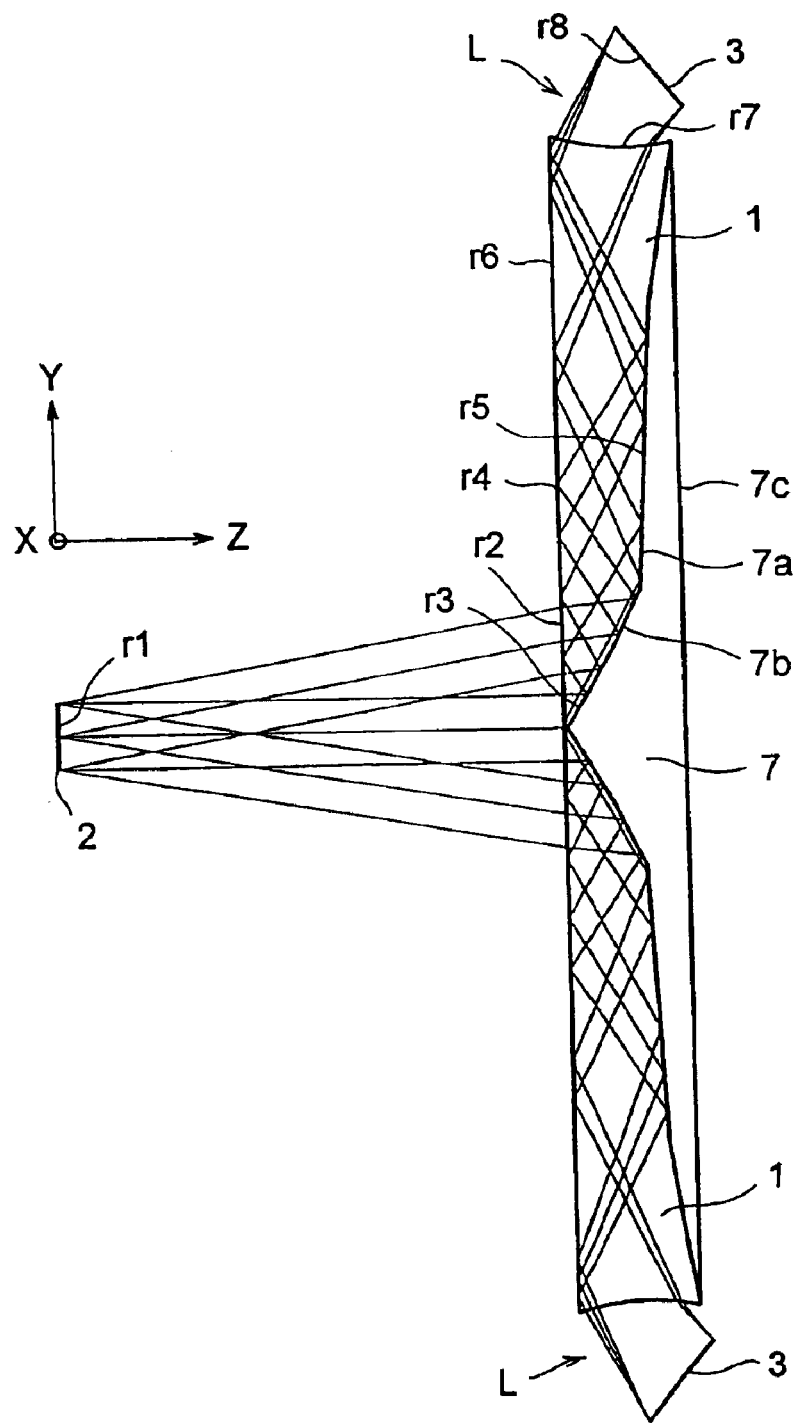
FIG. 19 is a vertical sectional view schematically illustrating the construction of an information display device of a thirteenth embodiment of the present invention.
Figure 20:
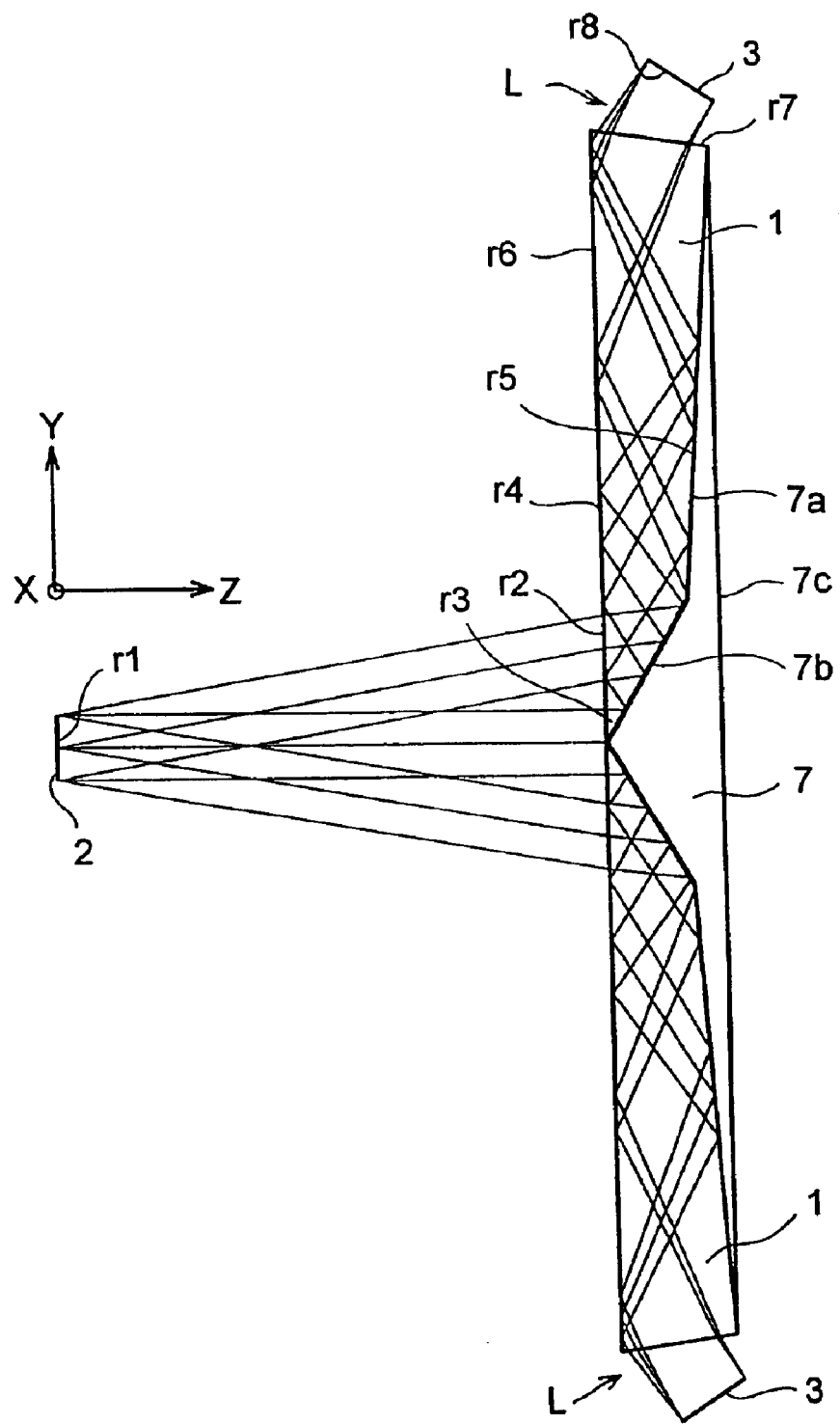
FIG. 20 is a vertical sectional view schematically illustrating the construction of an information display device of a fourteenth embodiment of the present invention.

FIGS. 19 and 20 are vertical sectional views schematically illustrating the constructions of information display devices of a thirteenth and a fourteenth embodiment of the present invention. The basic construction here is the same as the ninth and twelfth embodiments; however, in this embodiment, by arranging a deflection correction member for correcting deflection of external light, it is possible to perform see-through type information display in which an observer observes external light and image light with superimposing them. Hereinafter, this will be explained.

In the ninth and twelfth embodiments, by arranging the reflecting surfaces (a first and a second reflecting surface) facing each other with an inclination opening toward an incident surface of a light beam, the image display member is arranged on substantially right above the prism 1, and this helps make the entire optical system thin. In addition, for making the light-beam-selective surface have light beam selectivity that selectively performs total reflection or transmission in accordance with the incident angles of a light beam, the concave reflecting surface r3 or the hologram surface, and the light-beam-selective surface are arranged not parallel but in an inclined state.

In other words, in the upper part of the prism 1, for example, because the second reflecting surface r5 and the concave reflecting surface or the hologram surface r3 are obliquely arranged in the prism 1, the lower portion of the upper part of the prism 1 forms a cuneal shape, and the external light passing through this portion exits therefrom with being deflected. In addition, because it is transmitted through the concave surface, the light is affected by its optical power, and therefore a satisfactory see-through function is not secured.

Therefore, as shown in FIG. 19, the thirteenth embodiment is provided with a deflection correction member 7 which is a prism that has inclined surfaces 7a and 7b arranged in uniting with a second reflecting surface r5 and a concave reflecting surface r3 or parallel to them with a slight space in between, and that has a surface 7c that is parallel to a first reflecting surface. And, as shown in FIG. 20, the fourteenth embodiment is provided with a deflection correction member 7 which is a prism that has inclined surfaces 7a and 7b arranged in uniting with a second reflecting surface r5 and a hologram surface r3 or parallel to them with a slight space in between, and that has a surface 7c that is parallel to a first reflecting surface. Owing to this, deflection of external light is corrected, and this makes it possible to observe the external light in a natural manner.

Figure 21:
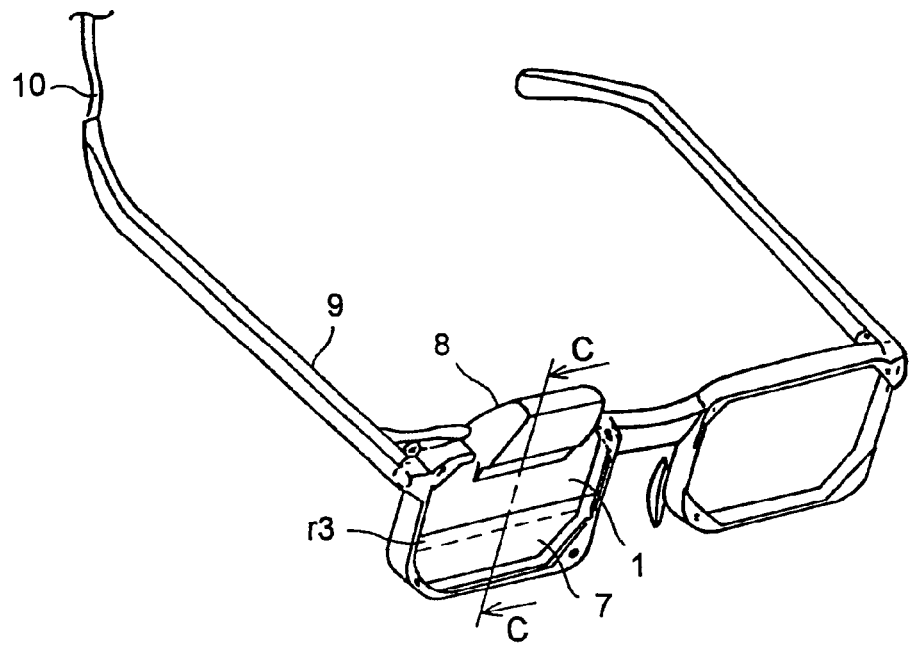
FIG. 21 is a diagram showing an outlook of an example of a head-mounted image display apparatus employing the present invention.

FIG. 21 is a diagram showing an outlook of a head-mounted image display apparatus employing the present invention. As previously described, the information display device of the present invention can be thinly constructed, and therefore, as shown in this figure, it is possible to realize an image display apparatus having a spectacles shape. Here, to the portion corresponding to the spectacle lenses, a prism 1 and a deflection correction member 7 are fitted, and an illumination optical system 8 is arranged above of them.

From the end of a flame 9, a code 10 extends and is connected to a not shown movable personal computer or a portable telephone so as to receive an image information therefrom. It is also possible to realize a wireless apparatus, if it is used in a close range. Because of the property of a hologram described earlier, it is possible to secure a high see-through function, and therefore this apparatus serves as an HMD (head mounted display) which unlikely to cause a user to be fatigued and is wearable all the time. This is also best suited for an image display apparatus for use in a so-called wearable computer.

Figure 22:
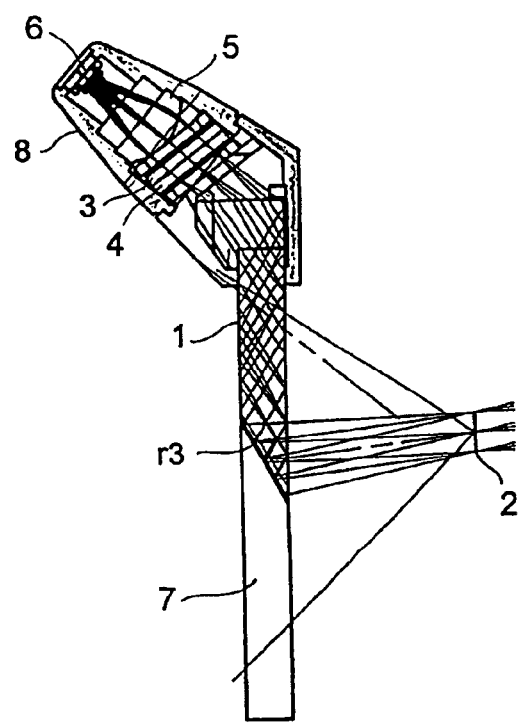
FIG. 22 is a vertical sectional view illustrating an information display device employed in a head-mounted image display apparatus.

FIG. 22 is a vertical sectional view illustrating the information display device of the image display apparatus employed in the head-mounted image display apparatus described above. In other words, this is a sectional view taken on line C—C of FIG. 21. As shown in this figure, light emitted from a light source 6 composed of an LED or the like in an illumination optical system 8 passes through a condenser lens 5 and illuminates an image display element 3. Here, the light is modulated and exits therefrom as image light, and is transmitted in a prism 1 after passing through an image display member 4, and then is reflected from a hologram surface r3 and reaches a pupil 2. In this structure, it is possible to perform see-through observation of an external image through the prism 1 and a deflection correction member 7. If the prism 1 and the deflection correction member 7 are made to serve as a lens element and provided with a diopter correction function, it is also possible to use it as conventional spectacles.

Figure 23:
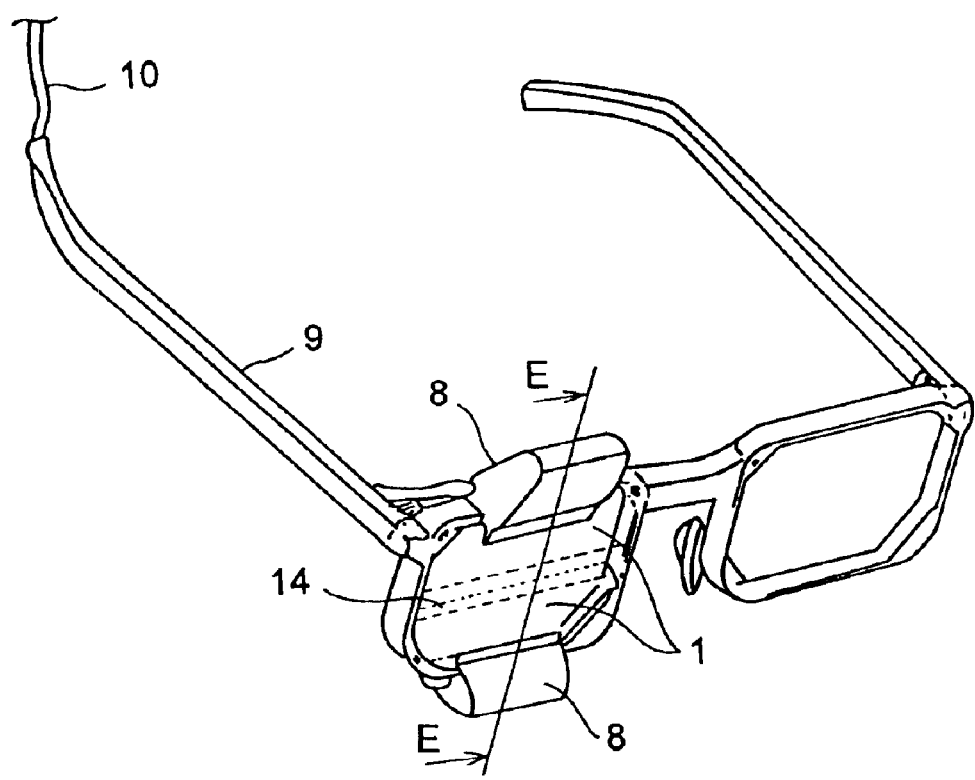
FIG. 23 is a diagram illustrating an outlook of another example of a head-mounted image display apparatus employing the present invention.

FIG. 23 is a diagram illustrating an outlook of another example of a head-mounted image display apparatus employing the present invention. Here, to the portion corresponding to the spectacle lenses, a prism 1 and a deflection correction member 14 (or 7) are fitted, and an illumination optical system 8 is arranged above or below of them.

From the end of a flame 9, a code 10 extends and is connected to a not shown movable personal computer or a portable telephone so as to receive an image information therefrom. It is also possible to realize a wireless apparatus, if it is used in a close range. Because of the property of a hologram described earlier, it is possible to secure a high see-through function, and therefore this apparatus serves as an HMD (head mounted display) which unlikely to cause a user to be fatigued and is wearable all the time. This is best suited for an image display apparatus for use in a so-called wearable computer.

Figure 24:
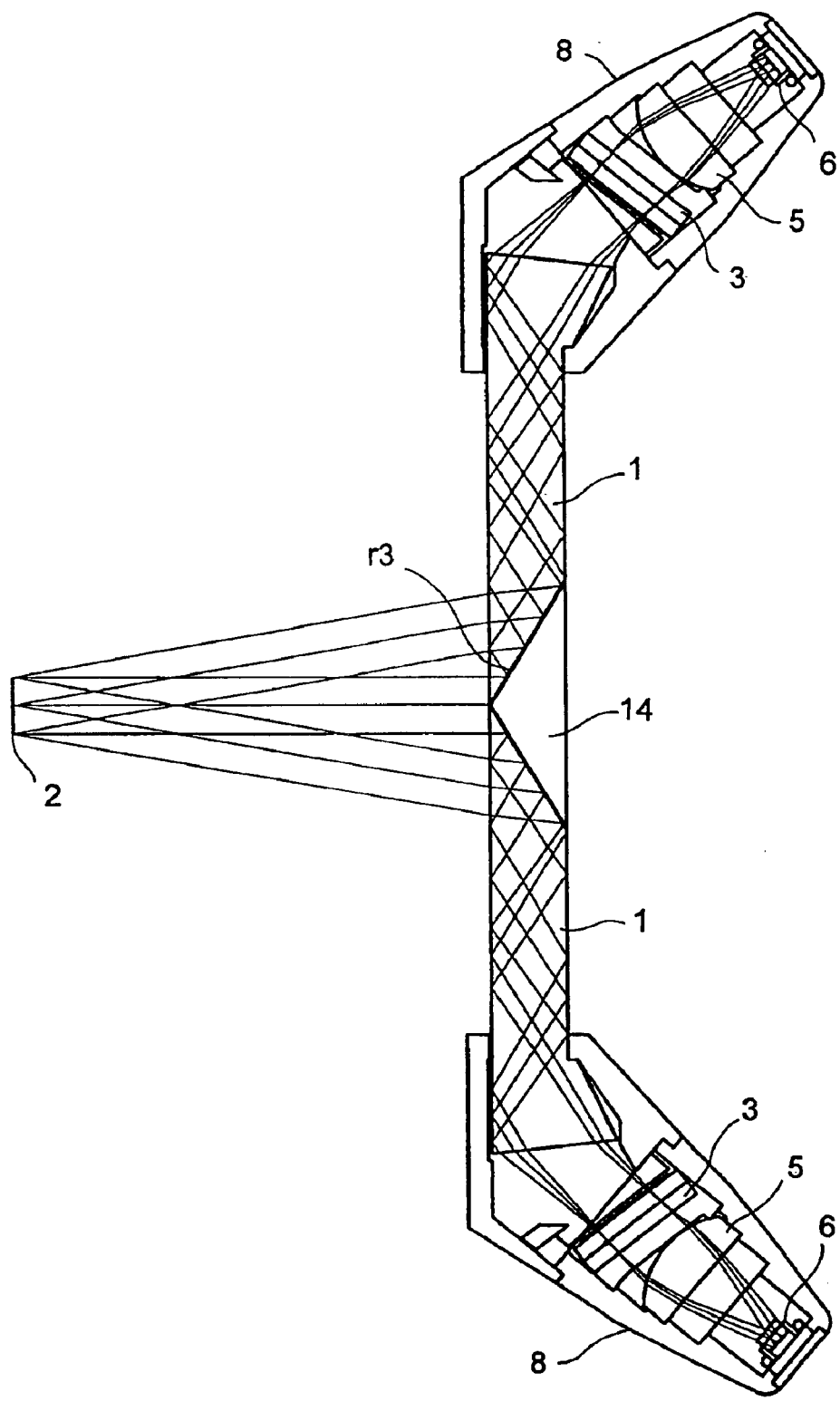
FIG. 24 is a vertical sectional view illustrating an information display device employed in a head-mounted image display apparatus.

FIG. 24 is a vertical sectional view illustrating the information display device of the image display apparatus employed in the head-mounted image display apparatus described above. In other words, this is a sectional view taken on line E—E of FIG. 23. As shown in this figure, light emitted from a light source 6 composed of an LED or the like in an illumination optical system 8 passes through a condenser lens 5 and illuminates an image display element 3. Here, the light is modulated and exits therefrom as image light, and is transmitted in a prism 1, and then is reflected from a concave reflecting surface or a hologram surface r3 and reaches a pupil 2. In this structure, it is possible to perform see-through observation of an external image through the prism 1 and a deflection correction member 14. If the prism 1 and the deflection correction member 14 are made to serve as a lens element and provided with a diopter correction function, it is also possible to use it as conventional spectacles.

Figure 25:
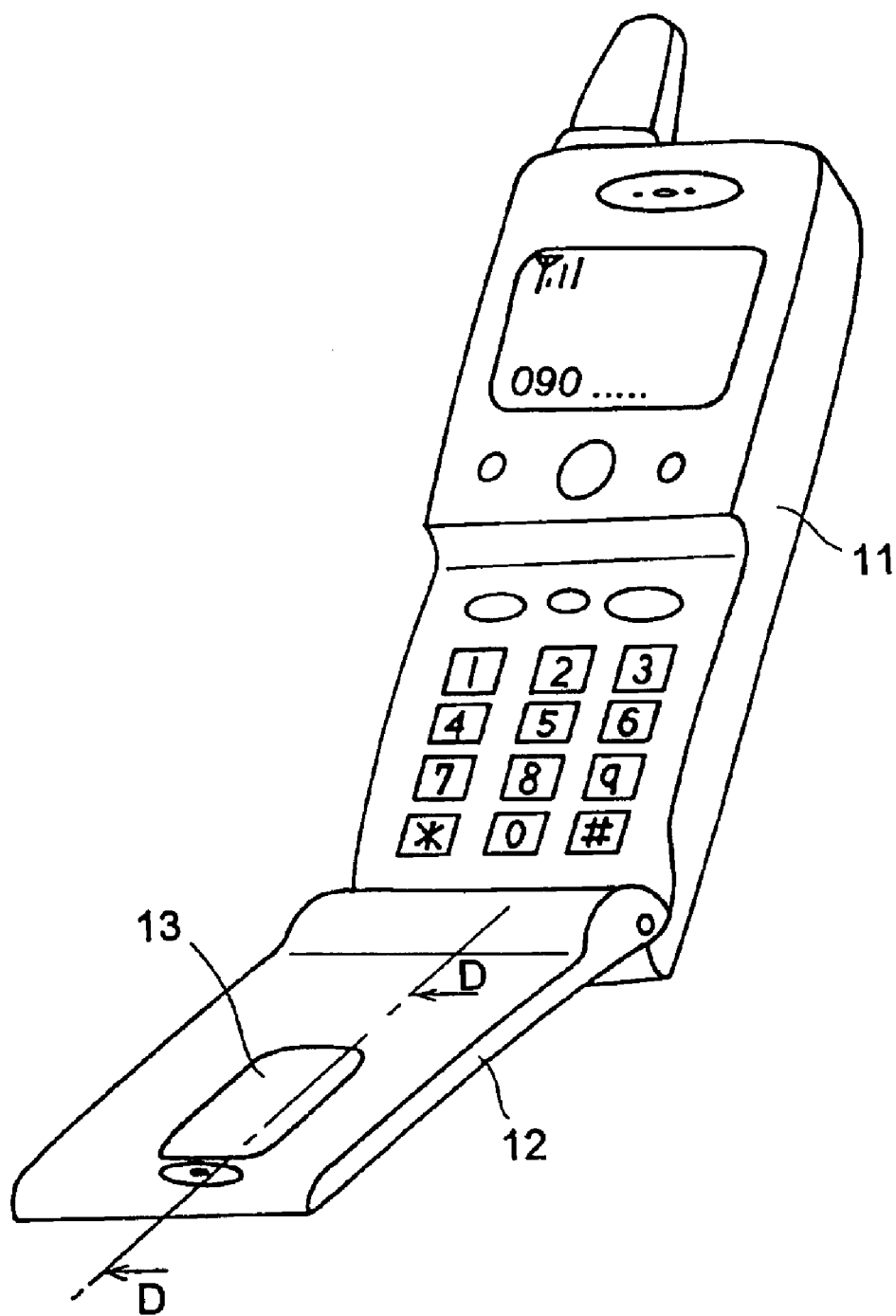
FIG. 25 is a diagram illustrating an outlook of an example applying the present invention to a portable telephone.

FIG. 25 is a diagram illustrating an outlook of an example applying the present invention to a portable telephone. Because it is possible to thinly construct the information display device of the present invention, as shown in this figure, it is possible to realize an image display device integrated in a flipper of a portable telephone. Here, in the flipper 12 which is rotatable with being pivoted on the main body 11 of the portable telephone, the information display device of the present invention is integrated, and the displayed image is observed through an observation window 13. Owing to this, it is possible to display a fine image having a wide field of view that is not obtainable by a conventional image display surface of a portable telephone.

The entire system from an illumination optical system to an eyepiece optical system is integrated in the flipper 12, and the arrangement of the individual optical systems are not changed by opening or closing the flipper 12, and thereby there is little chance for error. As described above, it is possible to integrate the information display device of the present invention in a conventional portable telephone without largely modifying the structure thereof, and this makes it possible to realize an image display apparatus having excellent portability.

Figure 26:
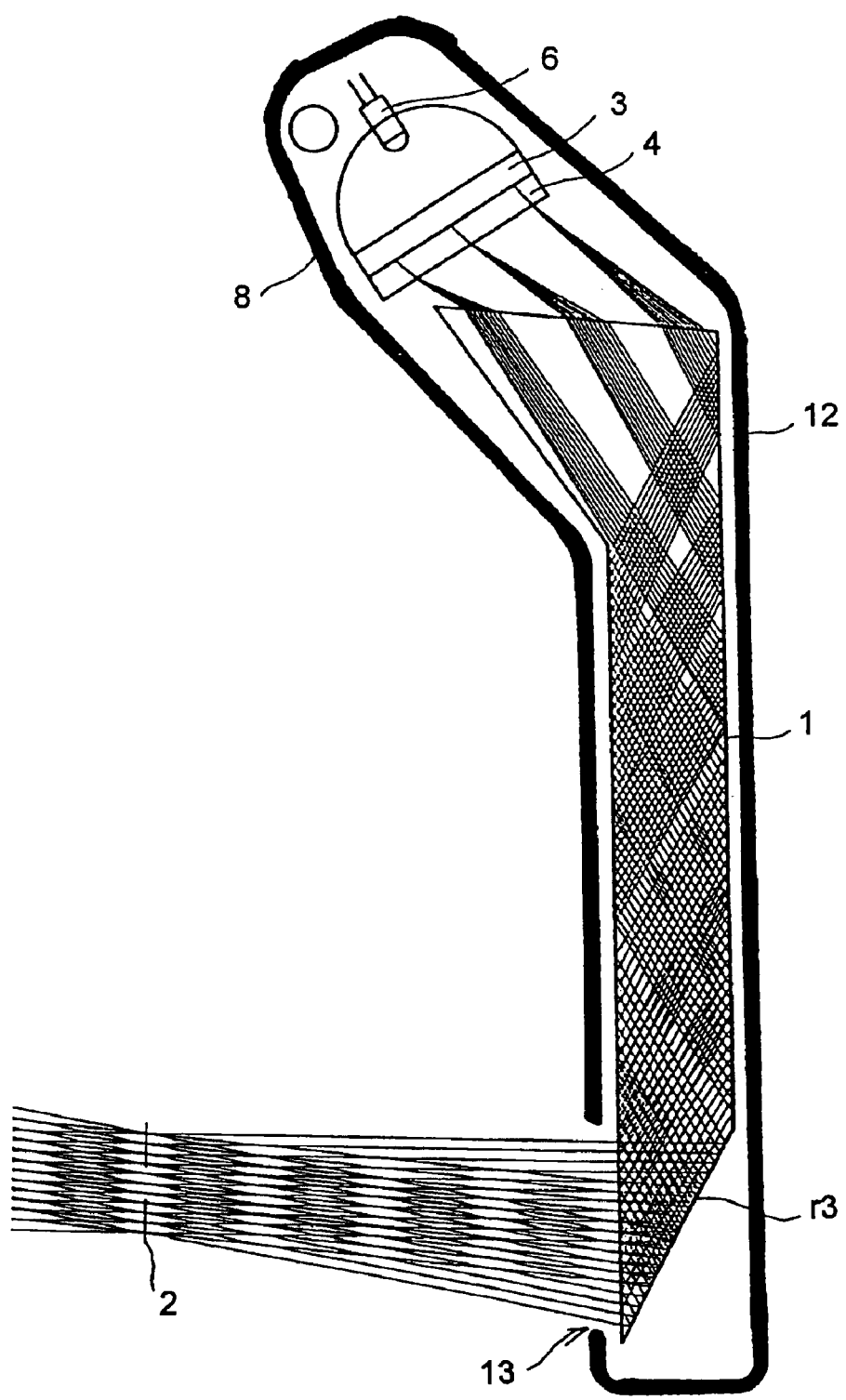
FIG. 26 is a vertical sectional view illustrating an information display device of an image display apparatus integrated in a flipper of a portable telephone.

FIG. 26 is a vertical sectional view illustrating the information display device of the image display apparatus integrated in the flipper 12 of a portable telephone as described above. In other words, this is a sectional view taken on line D—D of FIG. 25. As shown in this figure, light emitted from a light source 6 composed of an LED or the like in an illumination optical system 8 illuminates an image display element 3. Here, the light is modulated and exits therefrom as image light, and is transmitted in a prism 1 after passing through an image display member 4, and then is reflected from a hologram surface r3 and reaches a pupil 2 through an observation window 13.

Now, the optical constructions of the present invention will be described in more detail with reference to the construction data. The examples 1 to 6 described latter correspond to the first to sixth embodiments described above, and the examples 7 to 11 correspond to the eighth to twelfth embodiments described above. And all the holograms used in the examples of the invention have both a manufacturing wavelength (recording wavelength) and a using wavelength of 532 nm, and they are of the first-order usage. And the configuration data of each surface is expressed as a global coordinate system with having its origin at the center of pupil surface. The directions of the X-, Y- and Z-axis are as explained in FIGS. 7 and 14. And the locations of the individual surfaces are expressed as XSC, YSC, and ZSC, respectively. Here, the unit is mm. And the inclinations of the individual surfaces, when the X-, Y- and Z-axis function as the rotation axes, are expresses as ASC, BSC, and CSC. Here, the unit is degree.

As for a definition of the hologram surface, by defining the two light beams used for forming the hologram, the hologram surfaces are univocally defined. The two light beams are defined depend on the positions of the light sources of the individual light beams and the light beams emitted from the individual light sources is either a focusing beam (VIA) or an emitting beam (REA). The coordinates of a first point light source (HV1) and a second point light source (HV2) are expressed as (HX1, HY1, HZ1) and (HX2, HY2, HZ2), respectively.

In the individual embodiments, wavefront reproduction is performed by using a complicated hologram, and therefore, in addition to the definition of the two light beams, the hologram surface is defined by direction cosine of an exiting light beam relative to an incident light beam determined by the phase function $\phi$. As indicated in the following formula, the phase function $\phi$ is a generator polynomial at the hologram surface's position (X, Y), and is expressed as monomials having coefficients from the first to the tenth and arranged in a ascending order. In the construction data, the coefficients $C_j$ of the phase function $\phi$ are indicated.

$$\phi = C_1 X + C_2 Y + C_3 X^2 + C_4 XY + C_5 Y^2 + \ldots C_{65} Y^{10}$$

Note that, when the indices of X, Y are expressed as m, n, the number j of the coefficient $C_j$ is given by the formula below.

$$j = \{(m+n)^2 + m + 3n\}/2$$

wherein the direction cosine of an exiting light beam relative to the X-, Y- and Z-axis are given by the formulae below.

$$l' = l + \frac{\partial \phi}{\partial \chi} \cdot \frac{\lambda}{\lambda_0}$$

$$m' = m + \frac{\partial \phi}{\partial y} \cdot \frac{\lambda}{\lambda_0}$$

$$n' = l + \sqrt{1 - l'^2 - m'^2}$$

where l', m', and n' are the vectors of the direction of the normal to the exiting light beams, respectively;

l, m, and n are the vectors of the direction of the normal to the incident light beams, respectively;

λ represents the wavelength of a reproduced light beam; and

λ0 represents the wavelength of the light beam forming a hologram.

In the construction data, the parameters relative to the anamorphic aspheric surface regulate the sag Z (unit: mm) in the direction of the Z-axis defined by the following formula when the points of intersection between the individual surfaces and their optical axes are defined as the origins, and the optical axis is expressed as the Z-axis. And the radius of curvature in the data is the radius of curvature in the direction of the Y-axis, and RDX is the radius of curvature in the direction of the X-axis.

$$Z = (CUX \cdot X^2 + CUY \cdot Y^2)/[l + \{1-(1+KX) \cdot CUX^2 \cdot X^2 - (1+KY) \cdot CUY^2 \cdot Y^2\}^{1/2}] + AR \cdot \{(1-AP) \cdot X^2 + (1+AP) \cdot Y^2\}^2 + BR \cdot \{(1-BP) \cdot X^2 + (1+BP) \cdot Y^2\}^3 + CR \cdot \{(1-CP) \cdot X^2 + (1+CP) \cdot Y^2\}^4$$

wherein

CUX and CUY represent the curvatures in the directions of the X- and Y-axes, respectively.

TABLE 1

Practical Example 1

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Hologram Surface) | INFINITY | Reflecting Surface |
| Definitions of the two light beams | | |
| HV1: REA | HV2: VIR | |
| HX1: $0.000000 \times 10^{+0}$ | HY1: $-0.930000 \times 10^{+1}$ | HZ1: $-0.195000 \times 10^{+2}$ |
| HX2: $0.000000 \times 10^{+0}$ | HY2: $0.162516 \times 10^{+6}$ | HZ2: $-0.100000 \times 10^{+9}$ |
| HWL: 532 | | |
| Phase Coefficient | | |
| C2: $6.8824 \times 10^{-1}$ | C3: $-1.1420 \times 10^{-3}$ | C5: $3.4189 \times 10^{-3}$ |
| C7: $-4.0580 \times 10^{-4}$ | C9: $9.1503 \times 10^{-4}$ | C10: $-4.4137 \times 10^{-5}$ |
| C12: $9.0177 \times 10^{-5}$ | C14: $-2.5540 \times 10^{-3}$ | C16: $1.0035 \times 10^{-5}$ |
| C18: $-1.7171 \times 10^{-4}$ | C20: $2.0701 \times 10^{-3}$ | C21: $2.6206 \times 10^{-6}$ |
| C23: $-6.2010 \times 10^{-7}$ | C25: $9.8207 \times 10^{-5}$ | C27: $-8.9847 \times 10^{-4}$ |
| C29: $-1.0997 \times 10^{-6}$ | C31: $5.4344 \times 10^{-5}$ | C33: $-3.0341 \times 10^{-5}$ |
| C35: $2.2812 \times 10^{-4}$ | C36: $-6.8962 \times 10^{-8}$ | C38: $-2.1492 \times 10^{-7}$ |
| C40: $-2.6430 \times 10^{-6}$ | C42: $5.7609 \times 10^{-6}$ | C44: $-3.3908 \times 10^{-5}$ |
| C46: $3.8118 \times 10^{-8}$ | C48: $1.0893 \times 10^{-7}$ | C50: $4.2909 \times 10^{-7}$ |
| C52: $-6.2777 \times 10^{-7}$ | C54: $2.7298 \times 10^{-6}$ | C55: $2.4769 \times 10^{-10}$ |
| C57: $-5.5383 \times 10^{-9}$ | C59: $-7.9873 \times 10^{-9}$ | C61: $-2.3844 \times 10^{-8}$ |
| C63: $2.9452 \times 10^{-8}$ | C65: $-9.1747 \times 10^{-8}$ | |
| r4 (Light-Beam-Selective Surface) | INFINITY | Reflecting Surface |
| r5 (Second Reflecting Surface) | INFINITY | Reflecting Surface |
| r6 (First Reflecting Surface) | INFINITY | Reflecting Surface |
| r7 (Incident Surface) | INFINITY | AIR |
| r8 (Image Display Member) | INFINITY | BK7 |
| r9 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −4 | 14 | 2 | 0 | 0 |
| r3 | 0 | −3.5 | 14.52 | −26 | 0 | 0 |
| r4 | 0 | −4 | 14 | 2 | 0 | 0 |
| r5 | 0 | 1.6 | 17.2 | 2 | 0 | 0 |
| r6 | 0 | −4 | 14 | 2 | 0 | 0 |
| r7 | 0 | 18.5 | 16.274 | 92 | 0 | 0 |
| r8 | 0 | 22.624 | 18.559 | 54.146 | 0 | 0 |
| r9 | 0 | 23.272 | 19.028 | 54.146 | 0 | 0 |

TABLE 2

Practical Example 2

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Hologram Surface) | INFINITY | Reflecting Surface |

Definitions of the two light beams

HV1: REA HV2: VIR
HX1: $0.000000 \times 10^{+0}$  HY1: $0.000000 \times 10^{+0}$  HZ1: $0.000000 \times 10^{+0}$
HX2: $0.000000 \times 10^{+0}$  HY2: $0.000000 \times 10^{+0}$  HZ2: $0.000000 \times 10^{+0}$
HWL: 532

Phase Coefficient

| | | |
|---|---|---|
| C2: $2.6330 \times 10^{-1}$ | C3: $-1.9347 \times 10^{-2}$ | C5: $-1.1701 \times 10^{-2}$ |
| C7: $3.5433 \times 10^{-5}$ | C9: $1.5459 \times 10^{-3}$ | C10: $-2.3974 \times 10^{-5}$ |
| C12: $6.9740 \times 10^{-5}$ | C14: $-2.5481 \times 10^{-3}$ | C16: $8.8403 \times 10^{-6}$ |
| C18: $-1.0732 \times 10^{-4}$ | C20: $2.0558 \times 10^{-3}$ | C21: $2.2541 \times 10^{-6}$ |
| C23: $-2.2649 \times 10^{-6}$ | C25: $6.7359 \times 10^{-5}$ | C27: $-9.1221 \times 10^{-4}$ |
| C29: $-5.6362 \times 10^{-7}$ | C31: $3.0260 \times 10^{-6}$ | C33: $-2.2099 \times 10^{-5}$ |
| C35: $2.3860 \times 10^{-4}$ | C36: $-7.7663 \times 10^{-8}$ | C38: $-3.7407 \times 10^{-8}$ |
| C40: $-1.5800 \times 10^{-6}$ | C42: $4.2657 \times 10^{-6}$ | C44: $-3.6746 \times 10^{-5}$ |
| C46: $1.4380 \times 10^{-8}$ | C48: $4.9339 \times 10^{-8}$ | C50: $2.9537 \times 10^{-7}$ |
| C52: $-4.6725 \times 10^{-7}$ | C54: $3.0856 \times 10^{-6}$ | C55: $8.7525 \times 10^{-10}$ |
| C57: $-2.3972 \times 10^{-9}$ | C59: $-4.9346 \times 10^{-9}$ | C61: $-1.8629 \times 10^{-8}$ |
| C63: $2.2286 \times 10^{-8}$ | C65: $-1.0907 \times 10^{-7}$ | |

| Surface No. | Radius of Curvature | Medium |
|---|---|---|
| r4 (Light-Beam-Selective Surface) | INFINITY | Reflecting Surface |
| r5 (First Reflecting Surface) | INFINITY | Reflecting Surface |
| r6 (Second Reflecting Surface) | INFINITY | Reflecting Surface |
| r7 (First Reflecting Surface) | INFINITY | Reflecting Surface |
| r8 (Incident Surface) | INFINITY | AIR |
| r9 (Image Display Member) | INFINITY | BK7 |
| r10 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −4 | 14 | 2 | 0 | 0 |
| r3 | 0 | −3.5 | 14.52 | −26 | 0 | 0 |
| r4 | 0 | −4 | 14 | 2 | 0 | 0 |
| r5 | 0 | 1.6 | 17.2 | 2 | 0 | 0 |
| r6 | 0 | −4 | 14 | 2 | 0 | 0 |
| r7 | 0 | 1.6 | 17.2 | 2 | 0 | 0 |
| r8 | 0 | 26.173 | 17.367 | 85.959 | 0 | 0 |
| r9 | 0 | 29.819 | 10.670 | 123.868 | 0 | 0 |
| r10 | 0 | 30.483 | 10.224 | 123.868 | 0 | 0 |

TABLE 3

Practical Example 3

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Hologram Surface) | INFINITY | Reflecting Surface |

Definitions of the two light beams

HV1: REA HV2: VIR
HX1: $0.000000 \times 10^{+0}$  HY1: $-0.930000 \times 10^{+1}$  HZ1: $-0.195000 \times 10^{+2}$
HX2: $0.000000 \times 10^{+0}$  HY2: $0.162518 \times 10^{+6}$  HZ2: $-0.100000 \times 10^{+9}$
HWL: 532

Phase Coefficient

| | | |
|---|---|---|
| C2: $6.8432 \times 10^{-1}$ | C3: $-9.5823 \times 10^{-5}$ | C5: $2.2687 \times 10^{-3}$ |
| C7: $-4.4443 \times 10^{-4}$ | C9: $2.2032 \times 10^{-3}$ | C10: $-7.5545 \times 10^{-5}$ |
| C12: $2.5738 \times 10^{-4}$ | C14: $-4.0800 \times 10^{-3}$ | C16: $2.3576 \times 10^{-5}$ |
| C18: $-3.8193 \times 10^{-3}$ | C20: $2.8456 \times 10^{-3}$ | C21: $5.0913 \times 10^{-6}$ |
| C23: $-8.1124 \times 10^{-6}$ | C25: $2.2428 \times 10^{-4}$ | C27: $-1.0916 \times 10^{-3}$ |
| C29: $-1.9638 \times 10^{-6}$ | C31: $1.2774 \times 10^{-5}$ | C33: $-7.4305 \times 10^{-5}$ |
| C35: $2.4590 \times 10^{-4}$ | C36: $-1.3905 \times 10^{-7}$ | C38: $-2.6899 \times 10^{-7}$ |
| C40: $-5.6310 \times 10^{-6}$ | C42: $1.5023 \times 10^{-5}$ | C44: $-3.2193 \times 10^{-5}$ |
| C46: $6.3049 \times 10^{-8}$ | C48: $1.6803 \times 10^{-7}$ | C50: $9.2358 \times 10^{-7}$ |
| C52: $-1.7072 \times 10^{-6}$ | C54: $2.2437 \times 10^{-6}$ | C55: $8.2683 \times 10^{-10}$ |
| C57: $-9.9422 \times 10^{-9}$ | C59: $-1.1891 \times 10^{-8}$ | C61: $-5.3729 \times 10^{-8}$ |
| C63: $8.2292 \times 10^{-8}$ | C65: $-6.3340 \times 10^{-8}$ | |

| Surface No. | Radius of Curvature | Medium |
|---|---|---|
| r4 (Light-Beam-Selective Surface) | INFINITY | Reflecting Surface |
| r5 (Second Reflecting Surface) | INFINITY | Reflecting Surface |
| r6 (First Reflecting Surface) | INFINITY | Reflecting Surface |
| r7 (Incident Surface) | INFINITY | AIR |
| r8 (Image Display Member) | INFINITY | BK7 |
| r9 (Display Surface) | INFINITY | |

TABLE 3-continued

Practical Example 3

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −4 | 14 | 2 | 0 | 0 |
| r3 | 0 | −3.5 | 14.52 | −26 | 0 | 0 |
| r4 | 0 | −4 | 14 | 2 | 0 | 0 |
| r5 | 0 | 1.6 | 17.2 | 0 | 0 | 0 |
| r6 | 0 | 7.440 | 13.601 | 8 | 0 | 0 |
| r7 | 0 | 8.446 | −49.727 | 103.314 | 0 | 0 |
| r8 | 0 | 26.186 | 13.609 | 73.060 | 0 | 0 |
| r9 | 0 | 26.952 | 13.842 | 73.060 | 0 | 0 |

TABLE 4

Practical Example 4

| Surface No | Radius of Curvature | Medium |
|---|---|---|
| r1 (Pupil) | INFINITY | AIR |
| r2 (Light-Beam-Selective Surface) | 521.799 | PMMA |

Anamorphic Aspherical Surface

KY: 0.000000  KX: 0.000000  RDX: 1624.78
AR: −0.904617 × $10^{-6}$  BR: 0.545631 × $10^{-9}$  CR: 0.242759 × $10^{-11}$
AP: 0.000000 × $10^{+0}$  BP: 0.000000 × $10^{+0}$  CP: 0.000000 × $10^{+0}$

| | | |
|---|---|---|
| r3 (Hologram Surface) | INFINITY | Reflecting Surface |

Definitions of the two light beams

HV1: REA  HV2: VIR
HX1: 0.000000 × $10^{+0}$  HY1: −0.930000 × $10^{+1}$  HZ1: −0.195000 × $10^{+2}$
HX2: 0.000000 × $10^{+0}$  HY2: 0.162516 × $10^{+6}$  HZ2: −0.100000 × $10^{+9}$
HWL: 532

Phase Coefficient

C2: 6.8873 × $10^{-1}$  C3: −4.1293 × $10^{-3}$  C5: 2.3958 × $10^{-3}$
C7: −5.5767 × $10^{-4}$  C9: 7.1611 × $10^{-4}$  C10: −3.6017 × $10^{-5}$
C12: 2.7273 × $10^{-5}$  C14: −2.3152 × $10^{-3}$  C16: 1.1177 × $10^{-5}$
C18: −1.0588 × $10^{-4}$  C20: 1.8914 × $10^{-3}$  C21: 1.5599 × $10^{-6}$
C23: −2.4275 × $10^{-6}$  C25: 6.9042 × $10^{-5}$  C27: −8.5536 × $10^{-4}$
C29: −8.1008 × $10^{-7}$  C31: 2.9542 × $10^{-6}$  C33: −2.3916 × $10^{-5}$
C35: 2.2816 × $10^{-4}$  C36: −4.5807 × $10^{-8}$  C38: 4.6875 × $10^{-9}$
C40: −1.5252 × $10^{-6}$  C42: 4.8016 × $10^{-6}$  C44: −3.5890 × $10^{-5}$
C46: 1.9992 × $10^{-8}$  C48: 4.5134 × $10^{-8}$  C50: 2.8065 × $10^{-7}$
C52: −5.3410 × $10^{-7}$  C54: 3.0835 × $10^{-6}$  C55: 3.6847 × $10^{-10}$
C57: −3.2688 × $10^{-9}$  C59: −4.0812 × $10^{-9}$  C61: −1.7726 × $10^{-8}$
C63: 2.5477 × $10^{-8}$  C65: −1.1167 × $10^{-7}$

| | | |
|---|---|---|
| r4 (Light-Beam-Selective Surface) | 521.799 | Reflecting Surface (Anamorphic Aspherical Surface) |

KY: 0.000000  KX: 0.000000  RDX: 1624.78
AR: −0.904617 × $10^{-6}$  BR: 0.545631 × $10^{-9}$  CR: 0.242759 × $10^{-11}$
AP: 0.000000 × $10^{+0}$  BP: 0.000000 × $10^{+0}$  CP: 0.000000 × $10^{+0}$

| | | |
|---|---|---|
| r5 (Second Reflecting Surface) | 212.709 | Reflecting Surface (Anamorphic Aspherical Surface) |

KY: 0.000000  KX: 0.000000  RDX: 135.59298
AR: 0.449986 × $10^{-5}$  BR: 0.265979 × $10^{-7}$  CR: 0.143961 × $10^{-9}$
AP: 0.000000 × $10^{+0}$  BP: 0.000000 × $10^{+0}$  CP: 0.000000 × $10^{+0}$

| | | |
|---|---|---|
| r6 (First Reflecting Surface) | 521.799 | Reflecting Surface Anamorphic Aspherical Surface) |

KY: 0.000000  KX: 0.000000  RDX: 1624.78
AR: −0.904617 × $10^{-6}$  BR: 0.545631 × $10^{-9}$  CR: 0.242759 × $10^{-11}$
AP: 0.000000 × $10^{+0}$  BP: 0.000000 × $10^{+0}$  CP: 0.000000 × $10^{+0}$

| | | |
|---|---|---|
| r7 (Incident Surface) | 650.688 | AIR |
| r8 (Image Display Member) | INFINITY | BK7 |
| r9 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −4 | 14 | 2 | 0 | 0 |
| r3 | 0 | −3.5 | 14.52 | −26 | 0 | 0 |

TABLE 4-continued

Practical Example 4

| | | | | | | |
|---|---|---|---|---|---|---|
| r4 | 0 | −4 | 14 | 2 | 0 | 0 |
| r5 | 0 | 1.6 | 17.2 | 2 | 0 | 0 |
| r6 | 0 | −4 | 14 | 2 | 0 | 0 |
| r7 | 0 | 18.5 | 16.274 | 92 | 0 | 0 |
| r8 | 0 | 21.296 | 18.260 | 70.558 | 0 | 0 |
| r9 | 0 | 22.050 | 18.526 | 70.558 | 0 | 0 |

TABLE 5

Practical Example 5

| Surface No. | Radius of Curvature | Medium |
|---|---|---|
| r1 (Pupil) | INFINITY | AIR |
| r2 (Light-Beam-Selective Surface) | −3634.791 | PMMA |
| | | (Anamorphic Aspherical Surface) |
| KY: 0.000000 | KX: 0.000000 | RDX: 48284.671 |
| AR: $0.306096 \times 10^{-7}$ | BR: $0.180844 \times 10^{-10}$ | CR: $-0.845751 \times 10^{-11}$ |
| AP: $-0.256283 \times 10^{+1}$ | BP: $0.365035 \times 10^{+1}$ | CP: $0.881357 \times 10^{-1}$ |
| r3 (Hologram Surface) | INFINITY | Reflecting Surface |
| Definitions of the two light beams | | |
| HV1: REA | HV2: VIR | |
| HX1: $0.000000 \times 10^{+0}$ | HY1: $-0.930000 \times 10^{+1}$ | HZ1: $-0.195000 \times 10^{+2}$ |
| HX2: $0.000000 \times 10^{+0}$ | HY2: $0.162516 \times 10^{+6}$ | HZ2: $-0.100000 \times 10^{+9}$ |
| HWL: 532 | | |
| Phase Coefficient | | |
| C2: $6.9110 \times 10^{-1}$ | C3: $-8.9702 \times 10^{-4}$ | C5: $2.6889 \times 10^{-3}$ |
| C7: $-5.0039 \times 10^{-4}$ | C9: $2.1491 \times 10^{-3}$ | C10: $-7.6066 \times 10^{-5}$ |
| C12: $2.5558 \times 10^{-4}$ | C14: $-4.0910 \times 10^{-3}$ | C16: $2.3755 \times 10^{-5}$ |
| C18: $-3.8238 \times 10^{-4}$ | C20: $2.8438 \times 10^{-3}$ | C21: $5.0223 \times 10^{-6}$ |
| C23: $-8.0868 \times 10^{-6}$ | C25: $2.2409 \times 10^{-4}$ | C27: $-1.0917 \times 10^{-3}$ |
| C29: $-1.9433 \times 10^{-6}$ | C31: $1.2785 \times 10^{-5}$ | C33: $-7.4329 \times 10^{-5}$ |
| C35: $2.4587 \times 10^{-4}$ | C36: $-1.3752 \times 10^{-7}$ | C38: $-2.6743 \times 10^{-7}$ |
| C40: $-5.6290 \times 10^{-6}$ | C42: $1.5020 \times 10^{-5}$ | C44: $-3.2191 \times 10^{-5}$ |
| C46: $6.3467 \times 10^{-8}$ | C48: $1.6722 \times 10^{-7}$ | C50: $9.2383 \times 10^{-7}$ |
| C52: $-1.7073 \times 10^{-6}$ | C54: $2.2440 \times 10^{-6}$ | C55: $7.7127 \times 10^{-10}$ |
| C57: $-9.9455 \times 10^{-9}$ | C59: $-1.2020 \times 10^{-8}$ | C61: $-5.3627 \times 10^{-8}$ |
| C63: $8.2346 \times 10^{-8}$ | C65: $-6.3220 \times 10^{-8}$ | |
| r4 (Light-Beam-Selective Surface | −3634.791 | Reflecting Surface |
| | | (Anamorphic Aspherical Surface) |
| KY: 0.000000 | KX: 0.000000 | RDX: 48284.671 |
| AR: $0.306096 \times 10^{-7}$ | BR: $0.180844 \times 10^{-10}$ | CR: $-0.845751 \times 10^{-11}$ |
| AP: $-0.256283 \times 10^{+1}$ | BP: $0.365035 \times 10^{+1}$ | CP: $0.881357 \times 10^{-1}$ |
| r5 (Second Reflecting Surface) | −6093.456 | Reflecting Surface |
| | | (Anamorphic Aspherical Surface) |
| KY: 0.000000 | KX: 0.000000 | RDX: 1030.495 |
| AR: $0.841364 \times 10^{-6}$ | BR: $0.427764 \times 10^{-8}$ | CR: $0.255300 \times 10^{-10}$ |
| AP: $-0.745149 \times 10^{-1}$ | BP: $0.415246 \times 10^{-1}$ | CP: $0.691444 \times 10^{-1}$ |
| r6 (First Reflecting Surface) | 1337.490 | Reflecting Surface |
| | | (Anamorphic Aspherical Surface) |
| KY: 0.000000 | KX: 0.000000 | RDX: −162.844 |
| AR: $0.564099 \times 10^{-7}$ | BR: $-0.181479 \times 10^{-8}$ | CR: $0.199511 \times 10^{-11}$ |
| AP: $0.599536 \times 10^{-1}$ | BP: $-0.768584 \times 10^{+0}$ | CP: $0.141875 \times 10^{+0}$ |
| r7 (Incident Surface) | 964.322 | AIR |
| | | (Anamorphic Aspherical Surface) |
| KY: 0.000000 | KX: 0.000000 | RDX: −60.681 |
| AR: $-0.356007 \times 10^{-7}$ | BR: $-0.552592 \times 10^{-11}$ | CR: $0.175467 \times 10^{-14}$ |
| AP: $0.146587 \times 10^{+0}$ | BP: $0.453286 \times 10^{+0}$ | CP: $0.596221 \times 10^{-1}$ |
| r8 (Image Display Member) | INFINITY | BK7 |
| r9 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −4 | 14 | 2 | 0 | 0 |
| r3 | 0 | −3.5 | 14.52 | −26 | 0 | 0 |
| r4 | 0 | −4 | 14 | 2 | 0 | 0 |

TABLE 5-continued

| | | | Practical Example 5 | | | |
|---|---|---|---|---|---|---|
| r5 | 0 | 1.6 | 17.2 | 2 | 0 | 0 |
| r6 | 0 | 7.440 | 13.601 | 8 | 0 | 0 |
| r7 | 0 | 8.339 | −49.629 | 103.161 | 0 | 0 |
| r8 | 0 | 25.985 | 13.447 | 81.911 | 0 | 0 |
| r9 | 0 | 26.777 | 13.560 | 81.911 | 0 | 0 |

TABLE 6

Practical Example 6

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Hologram Surface) | INFINITY | Reflecting Surface |

Definitions of the two light beams

HV1: REA  
HX1: $0.000000 \times 10^{+0}$  
HX2: $0.000000 \times 10^{+0}$  
HWL: 532

HV2: VIR  
HY1: $-0.930000 \times 10^{+1}$  HZ1: $-0.195000 \times 10^{+2}$  
HY2: $0.162516 \times 10^{+6}$  HZ2: $-0.100000 \times 10^{+9}$ Phase Coefficient C2: $6.8410 \times 10^{-1}$   C3: $-1.1508 \times 10^{-3}$   C5: $2.6937 \times 10^{-3}$
C7: $-5.6257 \times 10^{-4}$   C9: $1.7114 \times 10^{-3}$   C10: $-9.2874 \times 10^{-5}$
C12: $1.5613 \times 10^{-4}$   C14: $-4.5934 \times 10^{-3}$   C16: $2.7208 \times 10^{-5}$
C18: $-2.2006 \times 10^{-4}$   C20: $3.9194 \times 10^{-3}$   C21: $6.5878 \times 10^{-6}$
C23: $-3.0441 \times 10^{-6}$   C25: $1.4211 \times 10^{-4}$   C27: $-1.8275 \times 10^{-3}$
C29: $-1.7862 \times 10^{-6}$   C31: $4.7416 \times 10^{-6}$   C33: $-5.0234 \times 10^{-5}$
C35: $5.0373 \times 10^{-4}$   C36: $-1.9904 \times 10^{-7}$   C38: $-1.7706 \times 10^{-7}$
C40: $-2.5102 \times 10^{-6}$   C42: $1.0445 \times 10^{-5}$   C44: $-8.1905 \times 10^{-5}$
C46: $4.8792 \times 10^{-8}$   C48: $1.4843 \times 10^{-7}$   C50: $4.1718 \times 10^{-7}$
C52: $-1.1815 \times 10^{-6}$   C54: $7.2665 \times 10^{-6}$   C55: $1.9918 \times 10^{-9}$
C57: $-8.2678 \times 10^{-9}$   C59: $-1.1773 \times 10^{-8}$   C61: $-2.2918 \times 10^{-8}$
C63: $5.5394 \times 10^{-8}$   C65: $-2.7140 \times 10^{-7}$

| Surface | Radius of Curvature | Medium |
|---|---|---|
| r4 (Light-Beam-Selective Surface) | INFINITY | Reflecting Surface |
| r5 (Second Reflecting Surface) | INFINITY | Reflecting Surface |
| r6 (First Reflecting Surface) | INFINITY | Reflecting Surface |
| r7 (Incident Surface) | INFINITY | AIR |
| r8 (Condenser) | 25 | BK7 |
| r9 (Image Display Member) | INFINITY | BK7 |
| r10 (Display Surface) | INFINITY | |
| r11 (Condenser) | 25 | AIR |
| r12 (Exiting Surface) | INFINITY | PMMA |
| r13 (Illuminant Reflecting Surface) | −23 | Reflecting Surface |
| r14 (Illumination Light Incident Surface) | INFINITY | AIR |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −4 | 14 | 2 | 0 | 0 |
| r3 | 0 | −3.5 | 14.52 | −26 | 0 | 0 |
| r4 | 0 | −4 | 14 | 2 | 0 | 0 |
| r5 | 0 | 1.6 | 17.2 | 2 | 0 | 0 |
| r6 | 0 | −4 | 14 | 2 | 0 | 0 |
| r7 | 0 | 19.331 | 37.594 | 87.098 | 0 | 0 |
| r8 | 0 | 22.567 | 18.147 | 70.784 | 0 | 0 |
| r10 | 0 | 23.984 | 18.641 | 70.784 | 0 | 0 |
| r11 | 0 | 22.567 | 18.147 | 70.784 | 0 | 0 |
| r12 | 0 | 19.331 | 37.594 | 87.098 | 0 | 0 |
| r13 | 0 | 16 | 18 | −60 | 0 | 0 |
| r14 | 0 | 17 | 13.2 | −15 | 0 | 0 |

TABLE 7

Practical Example 7

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Reflecting Surface) Anamorphic Aspherical Surface | −67.91807 | PMMA |

KY: −14.724953  KX: −20.432877  RDX: −47.45973
AR: −0.732699 × $10^{-5}$  BR: −0.163991 × $10^{-7}$  CR: 0.907725 × $10^{-10}$
AP: −0.281933 × $10^{+0}$  BP: −0.580876 × $10^{+0}$  CP: −0.477085 × $10^{+0}$

| Surface No. | Radius of Curvature | Medium |
|---|---|---|
| r4 (Light-Beam-Selective Surface) | INFINITY | PMMA |
| r5 (Second Reflecting Surface) | INFINITY | PMMA |
| r6 (First Reflecting Surface) | INFINITY | PMMA |
| r7 (Incident Surface) Anamorphic Aspherical Surface | 18.86098 | PMMA |

KY: 4.210342  KX: −1.870210  RDX: 20.49422
AR: 0.791098 × $10^{-5}$  BR: 0.825128 × $10^{-7}$  CR: 0.415047 × $10^{-7}$
AP: 0.774495 × $10^{+0}$  BP: −0.447736 × $10^{+0}$  CP: 0.512750 × $10^{-1}$

| Surface No. | Radius of Curvature | Medium |
|---|---|---|
| r8 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −1.5 | 14 | 0 | 0 | 0 |
| r3 | 0 | 2.773 | 12.370 | 33.850 | 0 | 0 |
| r4 | 0 | −1.5 | 14 | 0 | 0 | 0 |
| r5 | 0 | −1.5 | 17.5 | 0 | 0 | 0 |
| r6 | 0 | −1.5 | 14 | 0. | 0 | 0 |
| r7 | 0 | −22.677 | 17.183 | −85.277 | 0 | 0 |
| r8 | 0 | −24.465 | 20.645 | −29.042 | 0 | 0 |

TABLE 8

Practical Example 8

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Reflecting Surface) Anamorphic Aspherical Surface | −65.81128 | PMMA |

KY: −18.964415  KX: −26.532434  RDX: −45.77309
AR: −0.416493 × $10^{-5}$  BR: −0.227125 × $10^{-7}$  CR: 0.714349 × $10^{-10}$
AP: −0.111311 × $10^{+0}$  BP: −0.508864 × $10^{+0}$  CP: −0.483015 × $10^{+0}$

| Surface No. | Radius of Curvature | Medium |
|---|---|---|
| r4 (Light-Beam-Selective Surface) | INFINITY | PMMA |
| r5 (Second Reflecting Surface) | INFINITY | PMMA |
| r6 (First Reflecting Surface) | INFINITY | PMMA |
| r7 (Incident Surface) Anamorphic Aspherical Surface | 682.37441 | PMMA |

KY: −0.051939  KX: 356.459186  RDX: −107.42767
AR: 0.251651 × $10^{-4}$  BR: −0.239984 × $10^{-6}$  CR: 0.107859 × $10^{-7}$
AP: 0.144849 × $10^{+1}$  BP: 0.119571 × $10^{+0}$  CP: 0.110662 × $10^{+0}$

| Surface No. | Radius of Curvature | Medium |
|---|---|---|
| r8 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −1.5 | 14 | 0 | 0 | 0 |
| r3 | 0 | 6.695 | 9.614 | 37.425 | 0 | 0 |
| r4 | 0 | −1.5 | 14 | 0 | 0 | 0 |
| r5 | 0 | −6.2 | 17.5 | 3 | 0 | 0 |
| r6 | 0 | −1.5 | 14 | 0 | 0 | 0 |
| r7 | 0 | −26.746 | 22.320 | −96.260 | 0 | 0 |
| r8 | 0 | −28.092 | 19.877 | −38.862 | 0 | 0 |

TABLE 9

Practical Example 9

| Surface No. | Radius of Curvature | Medium |
|---|---|---|
| r1 (Pupil) | INFINITY | AIR |
| r2 (Light-Beam-Selective Surface) | −400 | PMMA |
| r3 (Reflecting Surface) Anamorphic Aspherical Surface | −53.50019 | PMMA |

KY: −11.608841  KX: −18.114889  RDX: −44.01804
AR: −0.941850 × $10^{-5}$  BR: −0.197815 × $10^{-7}$  CR: 0.150623 × $10^{-9}$
AP: −0.151288 × $10^{+0}$  BP: −0.106976 × $10^{+1}$  CP: −0.924051 × $10^{+0}$

| Surface No. | Radius of Curvature | Medium |
|---|---|---|
| r4 (Light-Beam-Selective Surface) | −400 | PMMA |
| r5 (Second Reflecting Surface) Rotationally Symmetrical Aspherical Surface | −477.32126 | PMMA |

K: 0.000000
A: 0.793161 × $10^{-7}$  B: 0.28269 × $10^{-8}$  C: 0.227445 × $10^{-11}$

| Surface No. | Radius of Curvature | Medium |
|---|---|---|
| r6 (First Reflecting Surface) | −400 | PMMA |
| r7 (Incident Surface) Anamorphic Aspherical Surface | 8.78367 | PMMA |

KY: −5.765127  KX: 0.620164  RDX: 20.95733
AR: 0.133517 × $10^{-4}$  BR: −0.126397 × $10^{-6}$  CR: 0.829424 × $10^{-7}$
AP: 0.269913 × $10^{+0}$  BP: −0.310065 × $10^{+1}$  CP: 0.125716 × $10^{+0}$

| Surface No. | Radius of Curvature | Medium |
|---|---|---|
| r8 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | 0.1 | 14 | 0 | 0 | 0 |
| r3 | 0 | 3.695 | 11.7 | 35.728 | 0 | 0 |
| r4 | 0 | 0.1 | 14 | 0 | 0 | 0 |
| r5 | 0 | 0.1 | 17.5 | 0 | 0 | 0 |
| r6 | 0 | 0.1 | 14 | 0 | 0 | 0 |
| r7 | 0 | −24.296 | 19.499 | −98.937 | 0 | 0 |
| r8 | 0 | −25.225 | 20.034 | −37.526 | 0 | 0 |

TABLE 10

Practical Example 10

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Reflecting Surface) Hologram | INFINITY | PMMA |

Definitions of the two light beams

HV1: REA
HX1: $0.000000 \times 10^{+0}$
HX2: $0.000000 \times 10^{+0}$
HWL: 532

HV2: VIR
HY1: $-0.930000 \times 10^{+1}$
HY2: $0.435556 \times 10^{+6}$

HZ1: $-0.195000 \times 10^{+2}$
HZ2: $-0.276247 \times 10^{+7}$

Phase Coefficient

C2: $-2.7403 \times 10^{-1}$    C3: $-5.5899 \times 10^{-4}$    C5: $3.5457 \times 10^{-3}$
C7: $1.1443 \times 10^{-4}$    C9: $1.2053 \times 10^{-4}$    C10: $2.1687 \times 10^{-5}$
C12: $-1.5075 \times 10^{-4}$    C14: $-5.4541 \times 10^{-4}$    C16: $1.1868 \times 10^{-5}$
C18: $-3.7214 \times 10^{-5}$    C20: $-2.5027 \times 10^{-4}$    C21: $-9.9841 \times 10^{-7}$
C23: $5.8089 \times 10^{-6}$    C25: $6.6827 \times 10^{-6}$    C27: $-4.6473 \times 10^{-5}$
C29: $-1.8211 \times 10^{-7}$    C31: $2.6129 \times 10^{-6}$    C33: $7.1404 \times 10^{-6}$
C35: $-1.0668 \times 10^{-6}$    C36: $1.7421 \times 10^{-8}$    C38: $1.4214 \times 10^{-8}$
C40: $6.8433 \times 10^{-7}$    C42: $1.7906 \times 10^{-6}$    C44: $8.8158 \times 10^{-7}$
C46: $3.7198 \times 10^{-9}$    C48: $1.0953 \times 10^{-8}$    C50: $8.3581 \times 10^{-8}$
C52: $1.9290 \times 10^{-7}$    C54: $1.2291 \times 10^{-7}$    C55: $-7.0148 \times 10^{-11}$
C57: $4.0400 \times 10^{-10}$    C59: $9.0113 \times 10^{-10}$    C61: $3.7530 \times 10^{-9}$
C63: $7.7647 \times 10^{-9}$    C65: $5.1387 \times 10^{-9}$

| Surface | Radius of Curvature | Medium |
|---|---|---|
| r4 (Light-Beam-Selective Surface) | INFINITY | PMMA |
| r5 (Second Reflecting Surface) | INFINITY | PMMA |
| r6 (First Reflecting Surface) | INFINITY | PMMA |
| r7 (Incident Surface) | INFINITY | PMMA |
| r8 (Display Surface) | INFINITY | |

Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −1.5 | 16 | 0 | 2 | 0 |
| r3 | 0 | 0.0467 | 16.4 | 30 | 0 | 0 |
| r4 | 0 | −1.5 | 16 | 0 | 0 | 0 |
| r5 | 0 | −1.5 | 19.8 | 0 | 0 | 0 |
| r6 | 0 | −1.5 | 16 | 0 | 0 | 0 |
| r7 | 0 | −21.316 | 36.342 | −83.546 | 0 | 0 |
| r8 | 0 | −26.338 | 24.785 | −57.550 | 0 | 0 |

TABLE 11

Practical Example 11

| Surface No. | Radius of Curvature | Medium |
|---|---|---|
| r1 (Pupil) | INFINITY | AIR |
| r2 (Light-Beam-Selective Surface) | INFINITY | PMMA |
| r3 (Reflecting Surface) Hologram | INFINITY | PMMA |

Definitions of the two light beams

HV1: REA
HX1: $0.000000 \times 10^{+0}$
HX2: $0.000000 \times 10^{+0}$
HWL: 532

HV2: VIR
HY1: $-0.930000 \times 10^{+1}$
HY2: $0.435556 \times 10^{+6}$

HZ1: $-0.195000 \times 10^{+2}$
HZ2: $-0.276247 \times 10^{+7}$

Phase Coefficient

C2: $-2.5943 \times 10^{-1}$    C3: $-3.2624 \times 10^{-4}$    C5: $1.6372 \times 10^{-3}$
C7: $3.0074 \times 10^{-4}$    C9: $-4.5208 \times 10^{-5}$    C10: $-1.4408 \times 10^{-5}$
C12: $4.5938 \times 10^{-5}$    C14: $-5.9452 \times 10^{-4}$    C16: $-1.6161 \times 10^{-6}$
C18: $8.0915 \times 10^{-5}$    C20: $-2.5984 \times 10^{-4}$    C21: $5.0639 \times 10^{-7}$
C23: $-1.1377 \times 10^{-6}$    C25: $3.4244 \times 10^{-5}$    C27: $-4.9979 \times 10^{-5}$
C29: $2.1833 \times 10^{-7}$    C31: $-1.8584 \times 10^{-6}$    C33: $8.3435 \times 10^{-6}$
C35: $-1.8062 \times 10^{-6}$    C36: $-1.1090 \times 10^{-8}$    C38: $-4.0064 \times 10^{-8}$
C40: $-5.6494 \times 10^{-7}$    C42: $1.3278 \times 10^{-6}$    C44: $9.1143 \times 10^{-7}$
C46: $-5.3456 \times 10^{-9}$    C48: $-1.2695 \times 10^{-8}$    C50: $-6.3208 \times 10^{-8}$
C52: $1.2463 \times 10^{-7}$    C54: $1.4644 \times 10^{-7}$    C55: $5.5275 \times 10^{-11}$
C57: $-5.9780 \times 10^{-10}$    C59: $-6.1101 \times 10^{-10}$    C61: $-2.4014 \times 10^{-9}$ TABLE 11-continued Practical Example 11

C63: 5.0146 × 10$^{-9}$    C65: 6.8781 × 10$^{-9}$
r4 (Light-Beam-Selective Surface)   INFINITY   PMMA
r5 (Second Reflecting Surface)      INFINITY   PMMA
r6 (First Reflecting Surface)       INFINITY   PMMA
r7 (Incident Surface)               INFINITY   PMMA
r8 (Display Surface)                INFINITY Configuration of Each Surface

| Surface | XSC | YSC | ZSC | ASC | BSC | CSC |
|---|---|---|---|---|---|---|
| r1 | 0 | 0 | 0 | 0 | 0 | 0 |
| r2 | 0 | −1.5 | 16 | 0 | 0 | 0 |
| r3 | 0 | −0.455 | 16.33 | 30 | 0 | 0 |
| r4 | 0 | −1.5 | 16 | 0 | 0 | 0 |
| r5 | 0 | −6.8 | 19.8 | 4 | 0 | 0 |
| r6 | 0 | −1.5 | 16 | 0 | 0 | 0 |
| r7 | 0 | −22.917 | 49.152 | −81.318 | 0 | 0 |
| r8 | 0 | −29.225 | 21.517 | −56.721 | 0 | 0 |

What is claimed is:

1. An information display device comprising:

an image display member which displays images;

a prism having at least two reflecting surfaces arranged in facing each other, and a hologram surface formed of a reflection-type hologram, and at least one of the two reflecting surfaces arranged in facing each other is a light-beam-selective surface which selectively transmits or reflects light; and a deflection correction member for correcting deflection of external light transmitted through the prism, the deflection correction member being adjacent to the prism at the hologram surface, the deflection correction member including two surfaces, each of the two surfaces being coplanar with a corresponding one of the at least two reflecting surfaces, wherein an image light beam that corresponds to image information and that exits from the image display member is reflected between the two reflecting surfaces arranged in facing each other, and is diffractively reflected on the hologram surface, and then, after being transmitted through the light-beam-selective surface, is directed to an observer's pupil, and wherein only the hologram has optical power.

2. An information display device as claimed in claim 1, wherein the hologram is a volume hologram.

3. An information display device as claimed in claim 1, wherein the hologram is a phase hologram.

4. An information display device as claimed in claim 1, wherein the hologram has optical power for projecting an image on an observer's pupil, while enlarging it.

5. An information display device as claimed in claim 1, wherein the hologram has a diffractive reflection angle wider than a regular reflection angle observed on the hologram surface.

6. An information display device as claimed in claim 1, wherein the reflecting surfaces arranged in facing each other have an inclination opening toward the incident side of a prism of the image light beam.

7. An information display device as claimed in claim 1, wherein the reflecting surfaces arranged in facing each other are substantially parallel to each other.

8. An information display device as claimed in claim 1, wherein reflection occurring between the reflecting surfaces arranged in facing each other is total reflection.

9. An information display device as claimed in claim 1, wherein the hologram surface is plane.

10. An information display device as claimed in claim 1, wherein the optical power of the hologram is nonaxisymmetric.

11. An information display device comprising:

a first image display member for displaying a first image;

a first prism having at least two reflecting surfaces arranged in facing each other and another reflecting surface, and at least one of the two reflecting surfaces arranged in facing each other is a light-beam-selective surface which selectively transmits or reflects light;

a second image display member for displaying a second image; and a second prism having the same construction as the first prism, wherein an image light beam corresponding to the information of the first image exiting from the first image display member is reflected between the two reflecting surfaces of the first prism arranged in facing each other, and is reflected on another reflecting surface of the first prism, and then, after being transmitted through the light-beam-selective surface, is directed to an observer's pupil, on the other hand, an image light beam corresponding to the information of the second image exiting from the second image display member is reflected between the two reflecting surfaces of the second prism arranged in facing each other, and is reflected on another reflecting surface, and then is, after being transmitted through the light-beam-selective surface, directed to the same observer's pupil as the light beam of the first image.

12. An information display device as claimed in claim 11, wherein the another reflecting surface has optical power for projecting an image on an observer's pupil, while enlarging it.

13. An information display device as claimed in claim 11, wherein the another reflecting surface has an angle inclined to the incidental side of the prism of the image light beam.

14. An information display device as claimed in claim 11, wherein the first image display member and the second image display member are connected to each other.

15. An information display device as claimed in claim 13, further comprising:
a deflection correction member for correcting deflection of external light that is transmitted through the prism.

16. An information display device as claimed in claim 11, wherein the another reflecting surface is a hologram surface formed of a reflection-type hologram.

17. An information display device as claimed in claim 16, wherein the hologram is a volume hologram.

18. An information display device as claimed in claim 16, wherein the hologram is a phase hologram.

19. An information display device as claimed in claim 16, wherein the hologram has optical power for projecting an image on an observer's pupil, while enlarging it.

20. An information display device as claimed in claim 16, wherein the hologram has a diffractive reflection angle wider than a regular reflection angle observed on the hologram surface.

21. An information display device as claimed in claim 11, wherein the reflecting surfaces arranged in facing each other has an inclination opening toward the incident side of the prism of the image light beam.

22. An information display device as claimed in claim 11, further comprising
a deflection correction member for correcting deflection of external light that is transmitted through the first and second prisms.

23. An information display device as claimed in claim 11, wherein the reflecting surfaces arranged in facing each other are substantially parallel to each other.

24. An information display device as claimed in claim 11, wherein reflection occurring between the reflecting surfaces arranged in facing each other is total reflection.

25. An information display device as claimed in claim 11, wherein at least one of the two reflecting surfaces arranged in facing each other is a curved surface.

26. An optical element comprising:
two reflecting surfaces arranged in facing each other, and at least one of the two reflecting surfaces is a light-beam-selective surface that selectively transmits or reflects light;
a hologram surface formed of a reflection-type hologram; and
a deflection correction member for correcting deflection of external light transmitted through the optical element, the deflection correction member being adjacent to the optical element at the hologram surface, the deflection correction member including two surfaces, each of the two surfaces being coplanar with a corresponding one of the two reflecting surfaces,
wherein light entering the optical element is reflected on the two reflecting surfaces, and after being reflected on the hologram surface is transmitted through the light-beam-selective surface and then exits therefrom, and
wherein only the hologram has optical power.

27. An information display device as claimed in claim 11, wherein at least one of the two reflecting surfaces arranged in facing each other is a curved surface.

* * * * *

UNITED STATES PATENT AND TRADEMARK OFFICE
CERTIFICATE OF CORRECTION

| | | |
|---|---|---|
| PATENT NO. | : 6,919,976 B2 | Page 1 of 1 |
| APPLICATION NO. | : 10/848889 | |
| DATED | : July 19, 2005 | |
| INVENTOR(S) | : Ichiro Kasai et al. | |

It is certified that error appears in the above-identified patent and that said Letters Patent is hereby corrected as shown below:

Column 37:
Line 4, delete "claim 13," and insert -- claim 11, --.

Column 38:
Line 20, delete "optical element" and insert -- prism --.
Lines 29-31, delete "27. An information display device as claimed in claim 11, wherein at least one of the two reflecting surfaces arranged in facing each other is a curved surface." and insert -- 27. An optical element as claimed in claim 26, wherein the optical power of the hologram is nonaxisymmetric. --.

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 6,919,976 B2  
APPLICATION NO. : 10/848889  
DATED : July 19, 2005  
INVENTOR(S) : Ichiro Kasai et al.

It is certified that error appears in the above-identified patent and that said Letters Patent is hereby corrected as shown below:

Column 37:  
Line 4, claim 15 delete "claim 13," and insert -- claim 11, --.

Column 38:  
Line 20, claim 26 delete "optical element" and insert -- prism --.  
Lines 29-31, claim 27 delete "27. An information display device as claimed in claim 11, wherein at least one of the two reflecting surfaces arranged in facing each other is a curved surface." and insert -- 27. An optical element as claimed in claim 26, wherein the optical power of the hologram is nonaxisymmetric. --.

Signed and Sealed this

Twenty-sixth Day of February, 2008

JON W. DUDAS  
*Director of the United States Patent and Trademark Office*